(12) United States Patent
Tulokas

(10) Patent No.: US 10,295,182 B2
(45) Date of Patent: May 21, 2019

(54) ARRANGEMENT AND BURNER AUTOMATION FOR ADJUSTING THE RATIO BETWEEN SUPPLIED AMOUNTS OF FUEL AND AIR IN AN INDUSTRIAL BURNER

(71) Applicant: Oilon Technology Oy, Lahti (FI)

(72) Inventor: Tero Tulokas, Lahti (FI)

(73) Assignee: Oilon Technology Oy, Lahti (FI)

( * ) Notice: Subject to any disclaimer, the term of this patent is extended or adjusted under 35 U.S.C. 154(b) by 407 days.

(21) Appl. No.: 15/099,148

(22) Filed: Apr. 14, 2016

(65) Prior Publication Data
US 2016/0305659 A1  Oct. 20, 2016

(30) Foreign Application Priority Data
Apr. 14, 2015  (FI) ..................................... 20155279

(51) Int. Cl.
*F23N 5/00* (2006.01)
*F23J 15/02* (2006.01)
(Continued)

(52) U.S. Cl.
CPC .............. *F23J 15/02* (2013.01); *F01N 3/101* (2013.01); *F23D 17/002* (2013.01); *F23N 1/002* (2013.01);
(Continued)

(58) Field of Classification Search
CPC ...... F23N 1/022; F23N 2037/08; F23N 1/002; F23N 2021/10; F23N 2037/02;
(Continued)

(56) References Cited

U.S. PATENT DOCUMENTS 3,757,521 A * 9/1973 Tourtellotte ........... B01D 53/86
60/274
4,406,611 A   9/1983 Michel
(Continued)

FOREIGN PATENT DOCUMENTS

EP   2037170 A1   3/2009
EP   2669575 A1   12/2013
(Continued)

OTHER PUBLICATIONS

Finnish Patent and Registration Office, Search Report dated Nov. 10, 2015 for Finnish patent appln. No. 20155279.
(Continued)

*Primary Examiner* — Jason Lau
(74) *Attorney, Agent, or Firm* — Berggren LLP

(57) ABSTRACT

An arrangement for adjusting the ratio between supplied amounts of fuel (PA) and air (I) in a burner, which is intended for a gaseous and/or liquid fuel is disclosed. The burner comprises a fuel and air mixing zone, a fuel supply conduit adapted to supply the mixing zone with a given inlet flow of fuel, a combustion air supply means adapted to supply the mixing zone with a given inlet flow of combustion air, and burner automation. The burner automation contains measuring instruments. The burner has its mixing zone accompanied by a combustion chamber which is in communication with a flue gas conduit. The combustion chamber or flue gas conduit has at least one catalytic zone. In the arrangement, the measuring instruments include at least one sensor, such as a lambda sensor, measuring the amount of residual oxygen in flue gases (flue gas oxidation/reduction potential). In the arrangement adjustment for an inlet flow ($Q_I$, $Q_{Itot}$) of combustion air generated by the combustion air (I) supply means (determined as a volume flow per unit time), as well as the adjustment for an inlet flow ($Q_{PA}$, $Q_{PAtot}$) of fuel arriving in the mixing zone by way
(Continued)

of the fuel supply conduit (determined as a volume flow per unit time), by means of burner automation, is based on the amount of residual oxygen measured from flue gases (S) with the measuring instrument, by way of which the burner automation adjusts the relative ratio between said inlet flow ($Q_I$, $Q_{Itot}$) of combustion air as well as the inlet flow ($Q_{P4}$, $Q_{P4tot}$) of fuel in such a way that the amount of residual oxygen is within the range of 0.05-0.5% in flue gases prior to the catalytic zone.

30 Claims, 6 Drawing Sheets

(51) Int. Cl.
    *F23N 1/02*        (2006.01)
    *F23D 17/00*      (2006.01)
    *F01N 3/10*        (2006.01)
    *F23N 1/00*        (2006.01)
    *F23N 3/08*        (2006.01)

(52) U.S. Cl.
CPC ............ *F23N 1/022* (2013.01); *F23N 3/082* (2013.01); *F23N 5/006* (2013.01); *F01N 2560/022* (2013.01); *F01N 2560/025* (2013.01); *F01N 2560/026* (2013.01); *F01N 2590/10* (2013.01); *F23D 2208/005* (2013.01); *F23J 2215/101* (2013.01); *F23J 2215/40* (2013.01); *F23J 2219/10* (2013.01); *Y02T 10/22* (2013.01)

(58) Field of Classification Search
CPC ........ F23N 5/00; F23N 1/007; F23N 2021/12; F23N 2035/06; F23N 5/006; F23N 5/242; F23N 2037/12; F23N 2037/26; F23N 2037/28; F23N 2041/18; F23N 3/002; F23N 5/003; F23N 5/02; F23N 5/022; F23N 5/102; F23N 5/16

See application file for complete search history.

(56) References Cited

U.S. PATENT DOCUMENTS

| | | | |
|---|---|---|---|
| 6,401,449 B1* | 6/2002 | Hofmann | .............. F01N 3/2066 423/212 |
| 6,634,168 B1 | 10/2003 | Yamamoto | |
| 7,399,458 B1 | 7/2008 | Martin | |
| 2002/0029561 A1* | 3/2002 | Ueno | .................... F01N 11/007 60/277 |
| 2004/0261402 A1* | 12/2004 | Sealy | .................. F02D 41/0295 60/285 |
| 2009/0325112 A1 | 12/2009 | Tanaka et al. | |
| 2011/0045419 A1* | 2/2011 | Gluck | ................... F23D 11/101 431/12 |
| 2011/0127355 A1* | 6/2011 | Tamura | ................... F23C 7/004 239/403 |
| 2011/0265451 A1 | 11/2011 | Gehret et al. | |
| 2015/0081086 A1* | 3/2015 | Hallowell | ................. F23G 7/10 700/209 |

FOREIGN PATENT DOCUMENTS

| | | |
|---|---|---|
| GB | 2092911 A | 8/1982 |
| WO | 2014/154931 A1 | 10/2014 |

OTHER PUBLICATIONS

European Patent Office, European Search Report dated Nov. 2, 2016 issued on application No. EP16165426.4.
Chinese Patent Office, Search Report of Chinese patent application No. 2016102686062, dated Nov. 12, 2018, 3 pages.

* cited by examiner

ARRANGEMENT AND BURNER AUTOMATION FOR ADJUSTING THE RATIO BETWEEN SUPPLIED AMOUNTS OF FUEL AND AIR IN AN INDUSTRIAL BURNER

PRIORITY

This application claims priority of the Finnish national application number FI20155279 filed on Apr. 14, 2015, the contents of which are incorporated herein by reference in entirety.

FIELD OF THE INVENTION

The invention relates to an arrangement as set forth in the preamble of claim 1 for adjusting the ratio between supplied amounts of fuel and air in an industrial burner, which is intended for a gaseous and/or liquid fuel.

The invention relates further to burner automation as set forth in the preamble of claim 27, which can be used in the arrangement or burner of the invention.

BACKGROUND OF THE INVENTION

One generally known industrial burner model, which is intended for gaseous and/or liquid fuels, comprises in connection with the windbox a fuel supply conduit for the combustion head and opening to the combustion head, as well as a combustion air supply conduit opening into the windbox. The windbox is associated with a combustion chamber, such as a boiler, which opens into a flue gas conduit. The burner operation is controlled by burner automation, comprising measuring instruments which include in particular a lambda sensor that measures the amount of residual oxygen in flue gases.

In another generally known, so-called monoblock industrial burner, intended for gaseous and/or liquid fuels, the air is supplied directly to the combustion head of a burner with an air blower included in the burner.

When an industrial burner is used for the combustion of liquid or gaseous fuels, there is a problem that the thermal combustion process always generates nitrogen oxides (NOx) because, at a high temperature (>1000° C.), the atmospheric nitrogen or organic nitrogen contained in fuel reacts with combustion air or oxygen contained in fuel. The higher the temperature and the longer the burn time, the more NOx emissions are produced. Another problem in the thermal combustion process is that thermal combustion is never complete, but the flue gas is always left with unburned hydrocarbons (VOC) and carbon monoxide (CO) as a result of incomplete combustion. The resulting amount of these is the higher, the lower the temperature and the shorter the burn time.

Therefore, the emissions resulting from reducible (NOx) and oxidizable (HC and CO) reactions are generated in conflicting temperature conditions, hindering the reduction thereof. Authorities have started to introduce stricter emission regulations based i.a. on BAT (Best Available Technology) resolutions in Europe BAC (Best Available Control) standards in the USA.

One possibility of reducing the amount of emissions is to use catalytic post-combustion known from the Applicant's WO application No. 2014/154931 in connection with the above-described burner by placing a catalytic converter in a combustion chamber, such as a boiler or flue gas conduit, present in association with the burner. In one embodiment of the above-mentioned patent application, the fuel is pre-combusted partially in at least one thermal pre-combustion zone of the burner and thereafter the post-combustion of pre-combustion-generated gases is carried out in at least one post-combustion zone provided with a catalytic converter for burning the pre-combustion-generated gases, for the reduction of pre-combustion-generated NOx's, and/or for the oxidation of hydrocarbon and carbon monoxide emissions. The post-combustion is conducted in at least one catalytic zone. In one embodiment of the above-mentioned application, the apparatus comprises a thermal burner which is supplied with a liquid or gaseous fuel, and the apparatus is further provided with at least one catalytic converter for the reduction of NOx's present in flue gases generated in thermal combustion, as well as for the oxidation of hydrocarbon and carbon monoxide emissions.

In case the aforesaid burner is adjusted without a feedback from flue gases, the oxygen content of flue gases shall vary roughly +/−1%, which corresponds to about 10% of the amount of combustion air. In a non-feedback system, 3% of residual oxygen (lambda=about 1.15) is in practice the minimum residual oxygen level to which the burner can be adjusted. The excess air of a burner can also be adjusted to a lower level by a feedback of the oxygen measurement conducted from flue gases. With oxygen measurement, the combustion air or fuel of a burner is controlled by burner automation so as to maintain the oxygen content of flue gas at about 2-3%. In addition to oxygen control, it is possible to employ carbon monoxide control which adjusts the residual oxygen to a lower level until small amounts of carbon monoxide begin to appear. This adjustment may enable an achievement of the residual oxygen level close to about 1% (lambda=about 1.05).

The use of a catalytic post-combustion method as described in the above-mentioned application has been said to require that an approximately stoichiometric air-fuel ratio during the thermal combustion process be maintained consistently.

It was now unexpectedly discovered in the invention that the stoichiometric fuel and air ratio required by the discussed method is practically unreachable with existing automation and fuel supply solutions in a design, wherein the accompanying flue gas conduit or boiler is provided with a so-called three-way catalytic converter. Even with several possible burner adjustment methods available, there is none that would achieve a sufficiently low residual oxygen level required for flue gases by the method described in the discussed application.

By just regulating the rate of total fuel flow and total combustion air flow, it will be difficult to reach the required concentrations of residual oxygen prior to the catalytic zone as a result of physical, burner control technology-related, as well as hardware-related limitations.

Additionally, it was discovered, that while it was sometimes possible to attain stoichiometric fuel and air ratio in a mixer zone of a burner and thereafter a proper flue gas composition before delivering this flue gas composition into catalytical zone with above "existing technology" for example by regulating the air/fuel ratio supplied into a burner conventional technology, "it was practically impossible to maintain said proper composition of flue gases except a very short time span.

SUMMARY OF THE INVENTION

With the aforesaid, thus far unrecognized problem as a starting point, it was a main objective of the invention to provide a catalytic converter-equipped industrial burner, in which the above-discussed method is applied and which consistently and continually enables a major reduction of nitrogen oxides NOx, as well as unburned hydrocarbons (VOC) and carbon monoxide (CO), present in flue gases generated in the thermal combustion process of a burner.

It was a second principal objective of the invention to provide an industrial burner, which has its combustion chamber or flue gas conduit provided with a catalytic converter, and which burner enables a stoichiometric air-fuel ratio to be sustained during thermal combustion.

One important further objective of the invention relates to a method, which enables the amounts of air and fuel for a burner to be adjusted in a (thermal) combustion process of the burner so as to reach low residual oxygen prior to a catalytic zone.

The term "industrial" burner in this application refers to an apparatus, which is capable of being connected to a combustion chamber such as a boiler and which comprises all devices needed for a combustion operation and its monitoring. These comprise fuel and air mixers, fuel supply means, air supply means, including air blowers that can be incorporated in the burner (a so-called monoblock burner) or separate (a so-called duoblock burner). In this application, the burner is considered to contain a main portion of burner automation such as combustion process monitoring and control devices, including measuring instruments for the composition of flue gases. After the combustion chamber but before the flue gas conduit is usually a heat exchange area.

The industrial burner has nominal output at least 3 MWh.

The present disclosure relates specifically to industrial burner which comprises a fuel and air mixing zone, a fuel supply conduit which is adapted to supply the mixing zone with a given inlet flow of fuel, as well as a combustion air supply means which is adapted to provide the mixing zone with a given inlet flow of combustion air, as well as burner automation which contains measuring instruments. The burner has its mixing zone accompanied by a combustion chamber which is in communication with measuring instruments in a flue gas conduit, said combustion chamber or flue gas conduit being provided with at least two catalytic zones. After the combustion chamber but before the flue gas conduit is a heat exchange area.

Term combustion chamber means herein furnace, combustion chamber or other limited space where combustion with industrial burner takes place.

Above mentioned objectives can be reached by an arrangement of claim 1 and by corresponding burner automation.

More specifically, the invention relates to an arrangement of claim 1, which comprises in combination:
an industrial burner adapted to burn gaseous and/or liquid fuel by adjusting the ratio between supplied amounts of fuel (PA) and air (I) in the burner, said burner comprising
a fuel and air mixing zone,
a fuel supply conduit adapted to supply the mixing zone with a given inlet flow of fuel,
a combustion air supply means adapted to supply the mixing zone with a given inlet flow of combustion air,
a burner automation containing measuring instruments including at least one lambda sensor for measuring amount of residual oxygen in flue gases (flue gas oxidation/reduction potential),
said burner having the mixing zone accompanied by a combustion chamber which is in communication with measuring instruments of a flue gas conduit, said combustion chamber or flue gas conduit being provided with at least two catalytic zones of at least one three-way catalytic converter(s), which catalytic zones are successive in progressing direction of flue gases,
wherein adjustment for an inlet flow of combustion air generated by the combustion air (I) supply means (determined as a volume flow per unit time), as well as the adjustment for an inlet flow of fuel arriving in the mixing zone by way of the fuel supply conduit (determined as a volume flow per unit time), by means of burner automation, is based on the amount of residual oxygen measured from flue gases (S) with the measuring instrument, by way of which the burner automation adjusts the relative ratio between said inlet flow ($Q_I$, $Q_{Itot}$) of combustion air as well as the inlet flow ($Q_{PA}$, $Q_{PAtot}$) of fuel in such a way that the amount of residual oxygen is within the range of 0.01-0.50% preferably within the range of 0.01-0.25% in flue gases prior to the catalytic zone,
after the combustion chamber in the flue gas conduit or heat exchange area after combustion chamber, before first catalytic zone of at least one three-way catalytic converter (s), in the flow direction of flue gases, is located a mixer for acquiring a homogenized flue gas mixture before delivering it to said catalytic converter.

In the above-discussed method the low amount of residual oxygen of 0.01-0.50% preferably of 0.01-0.25% in flue gases prior to the catalytic zone is achieved by using a system with feedback for regulating the ratio between a fuel flow arriving in a fuel and air mixing zone, particularly in a combustion head, and a combustion air flow arriving in an windbox present in association with the combustion head. In the system with feedback, the amount of residual oxygen is measured prior to a catalytic zone and the measured residual oxygen is used as a basis for adjusting the air/fuel ratio.

An essential aspect of the present invention is providing a mixer in the flue gas conduit or heat exchange area after combustion chamber. This mixer should be before the first catalytic zone of at least one three-way catalytic converter (s), in the flow direction of flue gases said mixer is intended for acquiring a homogenized flue gas mixture before delivering it to said catalytic converter. Homogenization of flue gas is required before flue gas is delivered into the catalytical zone because combustion chamber of an industrial burner is relatively large and therefore it has a tendency to contain pockets of high concentration of CO and low concentration of $O_2$ or vice versa.

Preferably in said homogenized flue gas mixture difference between maximal $CO/O_2$ ratio (both in moles/m$^3$) to minimal $CO/O_2$ ratio (both in moles/m$^3$) in flue gas flow, penetrating a cross section of said flue gas conduit or heat exchange area is less than 5% after said mixer.

These both adjustment steps, mentioned above, will bring the concentration of CO and NOx in flue gases before said catalytic converter consistently in a very low level. This consistency and low levels of CO and NOx prior or after catalytic converts has not been achieved before: the measured NOx should be within a range of 0-9 ppm and CO within a range of 0-100 ppm preferable in the range of 0-40 ppm after the second catalytic zone of catalytic converter(s). The proportion of $O_2$ to CO should be stoichiometric, about 0.5/1 (mole/mole), oxygen being additionally within the range of 0.01-0.50 preferably in the range of 0.01-0.25 vol % in flue gases prior to or at the first catalytic zone of at least one three-way converter;

The above mentioned stoichiometric oxygen/CO-proportion prior to catalytic converter is achieved in a preferred embodiment of the invention by first controlling the air/fuel-proportion in the main inlet flow of fuel. The air/fuel-proportion of this main fuel portion is based on a predetermined amount of residual oxygen in flue gases (preferably 1.0-2.5%). Additionally one should control the amount of second inlet portion of fuel which is based on defining the residual oxygen content of flue gases prior to the first catalytic zone of a at least one catalytic converter(s) in a combustion chamber or in a flue gas conduit and then adjusting the secondary inlet flow of fuel and combining this second inlet portion to main portion. In this connection it should be noted that defining the oxygen content of flue gases prior to the first catalytic zone can be performed by a lambda sensor located at the catalytic converter.

Thus the mixing zone, such as a combustion head, may be supplied with a secondary inlet flow of fuel or air, the supply rate of which is in turn based on measuring the amount of residual oxygen prior to first catalytic zone of at least one three-way catalytic converter(s) and on a precise control of the secondary inlet flow rate conducted on the basis of these measurements.

It is alternatively possible to regulate in a respective manner the rate of a combustion air flow arriving in a windbox (i.e. by dividing the combustion air flow into a primary flow and a secondary flow, with just the secondary flow being regulated in a feedback manner).

The above mentioned feedback system is achieved by a burner automation which uses so called Smith predictor for adjusting the amount of the ratio of fuel and air arriving to said mixing zone. To be more precise, the Smith predictor adjusts the secondary inlet flow of air or fuel.

In a more preferred embodiment of the invention, the low amount of residual oxygen in flue gases is nevertheless achieved by regulating the delivery of a primary inlet flow of fuel and a flow of combustion air to the flame by setting for these such supply rates that, based on estimates and calculations, it can be presumed that a given pre-defined amount of residual oxygen (1.0-2.5%) is reached prior to first catalytic zone of the at least one three-way catalytic converter(s).

In addition to this, the mixing zone, such as a combustion head, is supplied with a secondary inlet flow of fuel or air, the supply rate of which is in turn based on measuring the amount of residual oxygen prior to first catalytic zone of at least three-way catalytic converter(s) and on a precise control of the secondary inlet flow rate conducted on the basis of these measurement.

This measured residual oxygen should be kept in the range of 0.01-0.050 preferably 0.01-0.25% which means that the proportion of $O_2$ to CO should be stoichiometric or about 0.5/1 (mole/mole).

As the amount of residual oxygen is reduced in flue gases with the above-described method, as well as with a burner employed therein, there is simultaneously provided a capability of both enhancing efficiency of the burner and of keeping emissions at an extremely low level that is under 0.025% in flue gases prior to the first catalytic zone.

The level of $O_2$ in flue gases should be nearly stoichiometric as to amount of CO. The mean level of $O_2$ in moles (or vol %) compared to mean level of CO in moles (or vol %) should be 0.5/1 and variation of said proportion should be kept in the range of 0.998-1.002. This means, that if the concentration of CO in flue gases is about 6000 ppm, the concentration of $O_2$ should be correspondingly 1000-4000 ppm and mean value of O2 concentration should be about 3000 ppm.

More specifically, such a preferred method of the invention comprises the following steps of:

adjusting the amount of said primary inlet flow by means of burner automation and an actuator-equipped control valve present in a first transfer pipe system, based on a predetermined amount of residual oxygen in flue gases, preferably the amount of 1.0-2.5% residual oxygen in flue gases, and based on a primary inlet flow which is estimated or calculated on the basis thereof and which combines with a total inlet flow of fuel to be delivered to the combustion head by way of the supply conduit, and measuring the amount of residual oxygen in flue gases prior to the catalytic zone of a combustion chamber or flue gas conduit, adjusting the secondary inlet flow of fuel by means of burner automation and an actuator-equipped control valve present in a second transfer pipe system, based on the amount of residual oxygen measured from flue gases, whereby the burner automation adjusts the secondary inlet flow of fuel which combines with a total inlet flow of fuel arriving in the combustion head by way of a supply conduit, adjusting the amount of an inlet flow of combustion air arriving in a windbox by means of burner automation and an actuator present in a combustion air transfer pipe system, such that the adjustment of the combustion air inlet flow is based on a predetermined amount of residual oxygen in flue gases, preferably on the amount of 1.0-2.5% residual oxygen in flue gases.

The actuator-equipped control valve is for example a control valve adjustable with an electric motor, pneumatically or hydraulically.

On the other hand, the arrangement according to a preferred embodiment of the invention comprises:

adapting an inlet flow of fuel arriving in a combustion head by way of a fuel supply conduit to consist of two separately regulated portions of the inlet flow proceeding into the supply conduit by way a fuel transfer pipe system. The first portion of inlet flow comprises a primary inlet flow, which is adapted to travel in a first section of the transfer pipe system that is in fluid communication with the supply conduit, and which makes up 70-100% of the inlet flow, preferably 80-100% of the (total) inlet flow. The second portion of inlet flow comprises a secondary inlet flow, which is adapted to travel in a second section of the transfer pipe system that is likewise in fluid communication with the supply conduit, and which makes up 0-30% of the inlet flow, preferably 0-20% of the inlet flow, whereby the amount of said primary inlet flow of fuel is adjusted by means of burner automation and an actuator-equipped control valve present in a first transfer pipe system, based on a predetermined amount of residual oxygen in flue gases, preferably on the amount of 1.0-2.5% residual oxygen in flue gases, and on a primary inlet flow which is estimated or calculated on the basis thereof and which combines with the total inlet flow of fuel to be delivered to the combustion head by way of the supply conduit, and the secondary inlet flow of fuel is adjusted by means of burner automation and an actuator, such as an actuator-equipped control valve, present in a second transfer pipe system, based on the amount of residual oxygen measured from flue gases, whereby the burner automation adjusts the secondary inlet flow of fuel which combines with the total inlet flow of fuel arriving in the combustion head by way of the supply conduit, and the ratio of an (overall) fuel inlet flow to a combustion air flow arriving in the windbox is maintained such that the amount of residual oxygen is 0.01-0.50%, preferably 0.01-0.25%, in flue gases prior to the catalytic zone.

In a preferred embodiment of the arrangement according to the invention, the burner comprises a combustion head in connection with a windbox, a fuel supply conduit which opens onto the combustion head and which is adapted to supply the combustion head with a given inlet flow of fuel, as well as a combustion air supply conduit which opens into the windbox and which is adapted to supply the windbox with a given inlet flow of combustion air. The burner further comprises fuel and combustion air transfer pipe systems which are in fluid communication with the respective fuel or combustion air supply conduits, as well as burner automation which contains measuring instruments. The burner has its windbox accompanied by a boiler which opens into a flue gas conduit, said boiler or flue gas conduit being provided with at least one catalytic zone. The burner has its measuring instruments including at least one sensor, such as a lambda sensor, which measures the amount of residual oxygen in flue gases (flue gas oxidation/reduction potential), the adjustment by means of burner automation for a combustion air inlet flow arriving in its windbox by way of a combustion air supply conduit based on a predetermined amount of residual oxygen in flue gases, preferably on the amount of 1-2.5% residual oxygen in flue gases, and on the amount of combustion air estimated or calculated by means of burner automation on the basis thereof and to be delivered into the windbox, and the fuel inlet flow arriving at its combustion head by way of a fuel supply conduit adapted to consist of two separately regulated portions of the inlet flow proceeding into the supply conduit by way of a fuel transfer pipe system. The first portion of the inlet flow comprises a primary inlet flow, which is adapted to travel in a first section of the transfer pipe system that is in fluid communication with the supply conduit, and which makes up 70-100% of the inlet flow, preferably 80-100% of the inlet flow. The second portion of the inlet flow comprises a secondary inlet flow, which is adapted to travel in a second section of the transfer pipe system that is likewise in fluid communication with the supply conduit, and which makes up 0-30% of the inlet flow, preferably 0-20% of the inlet flow. Hence, the adjustment for said primary inlet flow of fuel adapted to travel in the first section of the transfer pipe system takes place by means of burner automation and an actuator, such as a control valve, present in the first transfer pipe system, and is based on a predetermined amount of residual oxygen in flue gases, preferably on the amount of 1-2.5% residual oxygen in flue gases, and on the amount of the primary inlet flow which is estimated or calculated on the basis thereof and which combines with the fuel inlet flow to be delivered to the combustion head by way of the supply conduit, and the adjustment for said secondary inlet flow of fuel adapted to travel in the second section of the transfer pipe system takes place by means of burner automation and actuators, such as control valves, present in the second transfer pipe system, and is based on the amount of residual oxygen measured from flue gases, by way of which the burner automation adjusts the secondary inlet flow of fuel which combines by way of the supply conduit with the inlet flow of fuel arriving in the combustion head, such that the amount of residual oxygen is 0.01-0.50%, preferably within the range of 0.01-0.25%, in flue gases prior to the catalytic zone.

In a manner consistent with the above description of regulating the amount of fuel by dividing its inlet flow arriving in the combustion head of a burner into two portions, whereof just the lesser flow is adjusted by regulation with feedback from flue gases, it is likewise possible to adjust also the inlet flow of combustion air into the windbox of a burner by dividing the combustion air flow into two portions, whereof just the secondary inlet flow is regulated with feedback.

Accordingly, in the arrangement according to a second preferred embodiment of the invention:

the adjustment by means of burner automation for a fuel inlet flow arriving in the combustion head by way of a fuel supply conduit and transfer pipe system is based on a predetermined amount of residual oxygen in flue gases, preferably on the amount of 1-2.5% residual oxygen in flue gases, and on the amount of fuel estimated or calculated on that basis and to be delivered to the combustion head, and the inlet flow of combustion air arriving in the windbox by way of a combustion air supply conduit is adapted to consist of two separately regulated portions of the inlet flow proceeding into the supply conduit by way of a combustion air transfer pipe system. The first portion of the inlet flow comprises a primary inlet flow, which is adapted to travel in a first section of the transfer pipe system that is in fluid communication with the supply conduit, and which makes up 70-100%, preferably 80-100%, of the inlet flow of combustion air, and whereof the second portion of inlet flow comprises a secondary inlet flow, which is adapted to travel in a second section of the transfer pipe system that is likewise in fluid communication with the supply conduit, and which makes up 0-30%, preferably 0-20%, of the inlet flow of combustion air. Hence, the adjustment for the amount of said primary inlet flow of combustion air adapted to travel in the first section of the transfer pipe system takes place by means of burner automation and an actuator, such as an amount control valve, present in the first transfer pipe system, and is based on a predetermined amount of residual oxygen in flue gases, preferably on the amount of 1-2.5% residual oxygen in flue gases, and on the amount of the primary inlet flow of combustion air which is estimated or calculated on the basis thereof and which combines with the inlet flow of combustion air to be delivered to the combustion head by way of the supply conduit, and the adjustment for the amount of said secondary inlet flow of combustion air adapted to travel in the second section of the transfer pipe system takes place by means of burner automation and actuators, such as control valves, present in the second transfer pipe system, and is based on the amount of residual oxygen measured from flue gases, by way of which the burner automation adjusts the secondary inlet flow of combustion air, which travels by way of the second section of the transfer pipe system and which combines with the inlet flow of combustion air arriving in the windbox by way of the supply conduit, such that the amount of residual oxygen is 0.01-0.50%, preferably 0.01-0.25%, in flue gases prior to the catalytic zone.

As the amount of residual oxygen is reduced in flue gases with the above-described method, as well as with a burner or arrangement employed therein, there is simultaneously provided a capability of both enhancing efficiency of the burner and of keeping emissions at an extremely low level.

In one preferred embodiment of the invention, three way catalytic converter (401) is located in flue gas conduit and comprises at least one three-way catalytic converter with two catalytic zones or at least two three-way catalytic converters with one catalytic zone and between which catalytic zones opens an additional supply conduit which enables delivering supplementary air between said catalytic zones. This way, the catalytic converter can be provided with an expanded operating range, such that the flue gas arriving at first catalysts can have a lambda of less than 1, specifically 0.9-1. In this case, the reduction of nitrogen oxides, as well as the oxidation of hydrocarbon and carbon monoxide emissions, is still adequately effective in the first catalyst regardless of sub-stoichiometric conditions prior to the first catalytic zone, and the remaining unoxidized CO and VOC emissions shall then be oxidized by means of supplementary air in the latter catalyst. As mentioned before the adjustment of level of unoxidized CO and VOC emissions can be performed very quickly in said catalytic converter.

In another preferred embodiment of the invention, the flue gas comprising $O_2$, CO, NOx gases which arrive to catalytic zone of said catalytic converter(s) have been homogenized by a mixer located in flue gas conduit or in a heat exchange area after burner's combustion chamber for delivering a homogenous flue gas mixture into said catalytic converter. Homogenization of flue gases is needed before they enter the catalytic zone(s) because combustion chamber of and industrial burner is relatively large and therefore there it has a tendency to include pockets of high concentration of CO.

In yet another preferred embodiment of the invention, the ratio of a combustion air flow arriving in the windbox to a fuel flow arriving at the combustion head is adapted to oscillate within a specific steadily constant range. Since the ratio of a fuel flow intended for the flame to a combustion air flow varies from slightly lower than stoichiometric to slightly higher than stoichiometric, there is provided a capability of further expanding the effective operating range of a catalytic converter, i.e. the maximum accepted quantity of residual oxygen prior to a catalytic zone. Preferably, the rate of air flow delivered into a burn zone is maintained constant and the amount of fuel is allowed to oscillate so as converge towards a desired air/fuel ratio.

In one preferred embodiment of the invention, it is possible to have the amount of combustion air I adjusted by one or more blowers present in the transfer pipe system, well as by dampers with adjustable opening degrees or by control valves. In this case, to the blower is preferably connected a frequency transformer that enables an adjustment of the blower motor's input power and thereby the rotational speed of the blower motor, as well as the air flow velocity, depending on a utilization rate of the burner.

Having the blower equipped with a frequency transformer enables lower amounts of residual oxygen in flue gases to be reached, the burner efficiency to be enhanced, as well as the power consumption of blowers to be reduced.

In another preferred embodiment of the invention, the rate adjustment of a secondary inlet flow of fuel takes place by means of at least one actuator-equipped control valve and at least one actuator-equipped on/off valve.

The actuator-equipped control valve is for example a valve adjustable with an electric motor, pneumatically or hydraulically.

Thus, the measuring instruments include a lambda sensor which measures residual oxygen and which is located upstream (prior) of the catalytic zone, and additionally a sensor which measures the amount of nitrogen oxides NOx from flue gases, and/or a sensor which measures the amount of carbon monoxide from flue gases. The NOx as well as CO sensors may be present upstream of downstream of the first catalytic zone. In one implementation of the invention, these are located downstream of the catalytic zone in a flue gas conduit. In this case, the adjustment of a secondary inlet flow of fuel traveling in a second section of the transfer pipe system is additionally based on the amount of carbon monoxide measured from flue gases and/or on the amount of nitrogen oxides, such that the burner automation regulates, on the basis of nitrogen oxides and carbon monoxide measured from flue gases, the rate of the secondary inlet flow of fuel by means of actuators, such as actuator-equipped control valves, included in the second section of the transfer pipe system.

This preferred embodiment of the invention provides a capability of further reducing the amount of NOx, CO, and hydrocarbon emissions The invention and benefits attainable thereby will now be elucidated further with reference to the accompanying figures.

SHORT DESCRIPTION OF THE DRAWINGS

Figure 5:
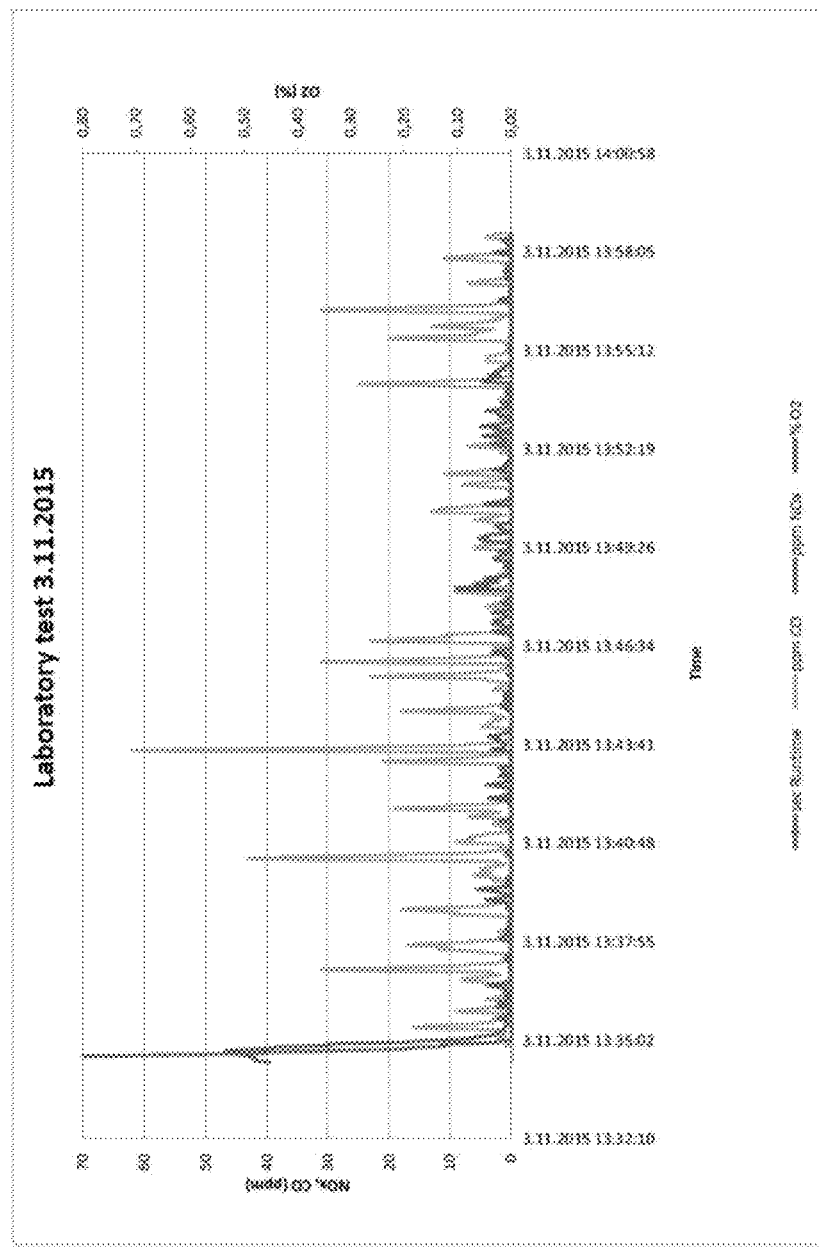

FIG. 5 reveals a test arrangement of a test burner having construction and function according to present invention.

Figure 6:
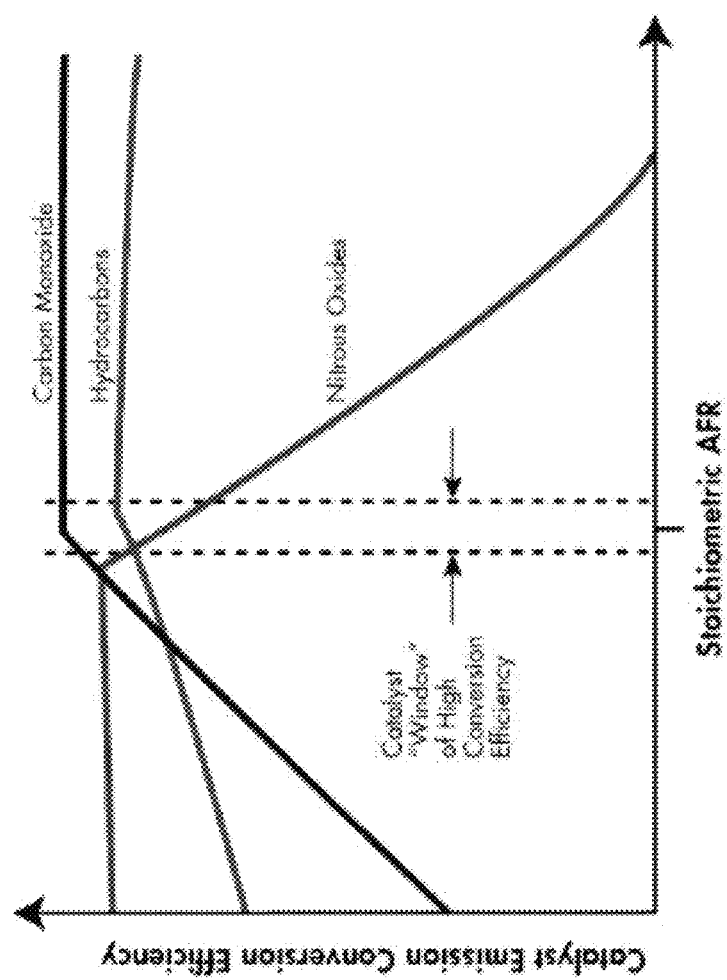

FIG. 6 shows test results of using optimal three-way catalytic converter.

DETAILED DESCRIPTION

As can be seen from FIG. 5 shows test results from 2.6 MW capacity industrial burner with applied catalytic flue gas treatment (Oilon laboratory Lahti, Finland). The burner construction and function was similar as defined in claims. As can be seen from FIG. 5 NOx average was through measuring period<2 ppm (dry) and CO average was through measuring period<4 ppm (dry).

FIG. 6 shows a flue gas concentration before a three-way catalytic converter which enables most efficient conversion of NOx and CO in a catalytical zone of said a three-way converter. The following reactions take place in a three-way converter:

Main oxidation reactions:

$$CO+0.5O_2 \rightarrow CO_2$$

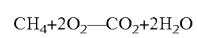

$$CH_4+2O_2 \rightarrow CO_2+2H_2O$$

Main reduction reactions:

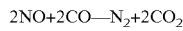

As can be seen from FIG. 6, air to fuel ratio (α) should be almost stoichiometric in fuel gases before a three-way catalytic converter said ratio. The amount of $O_2$ to mean amount of CO (mole/mole) should be nearly stoichiometric; the mean amount of $O_2$ (in moles) to mean amount of CO gases (in moles) should be about 0.5/1 mole/mole in flue gases before said flue gases enter the three-way catalytic converter in the flow direction of flue gases.

This means that if CO concentration in flue gases just before entering catalytic zone of a three-way catalytic converter is typically 3000 ppm, the amount of $O_2$ may vary 1500 ppm+−1000 ppm. Lambda should be in the range of 0.997-1.003.

In usual CO-levels in exhaust gases generated by an industrial burner before said three-way converter, said exhaust gases (flue gases) may contain only 0.01-0.50%, preferably 0.01-0.25% of $O_2$ to enable catalytic conversions of CO and NOx to take place optimally in said three-way catalytic converter.

In addition, it was detected in a separate test that, in case the amounts of fuel and oxygen were allowed during thermal combustion to oscillate in such a way that the ratio of fuel and combustion air in thermal combustion was alternately sub-stoichiometric and alternately over-stoichiometric, there was provided a capability of increasing the maximum acceptable amount of residual oxygen prior to a catalytic zone so as to allow the presence of 0.01-0.50% residual oxygen in flue gases prior to the catalytic zone. This means that the amount of residual oxygen is only allowed to be not more than about a half of what has been reached with prior known adjustment methods applied to the ratio of oxygen and combustion air in a burner.

The stoichiometric $O_2$/CO ratio in exhaust gases before a three-way catalytic converter, demanded for a efficient conversion of NOx- and CO-gases cannot be reached by normal industrial burners because this requires nearly stoichiometric air/fuel ratio in burner and strict $O_2$ levels (0.01-0.50 preferably 0.01-0.25) before the first catalytic zone of at least one three-way catalytic converter.

FIGS. 1-4 represent a burner and burner automation, providing a capability of reaching, in such a burner, a sufficiently low amount of residual oxygen prior to a catalytic zone of a three-way converter As presented in FIGS. 5 and 6 there should be only 0.01-0.50% more preferably 0.01-0.25% of oxygen in flue gases before the first catalytic zone of at least one three-way catalytic converter.

Figure 1:
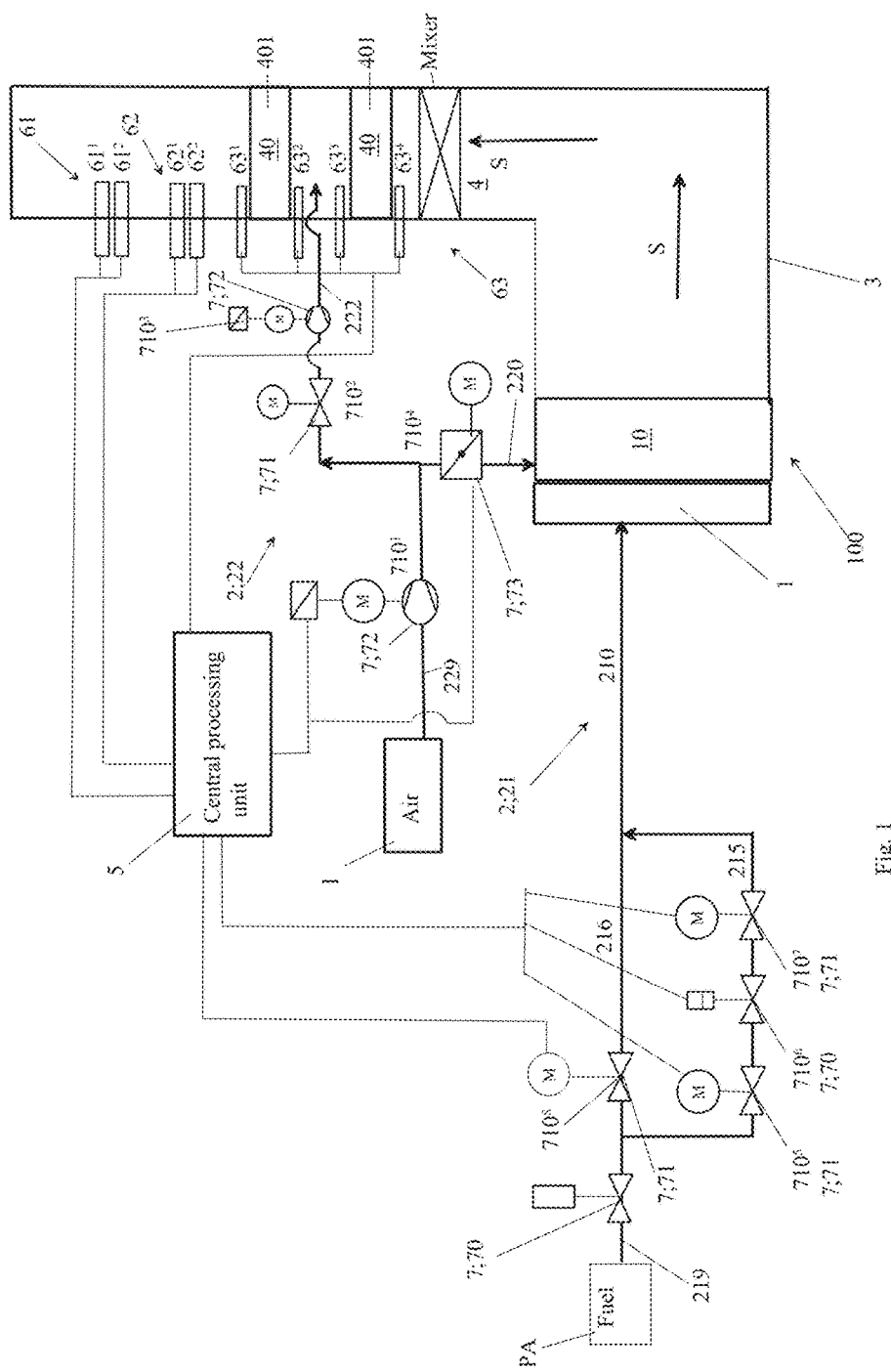
FIG. 1 shows schematically one burner of the invention and burner automation employed therein and used for precisely adjusting the amount of fuel.
Figure 2A:
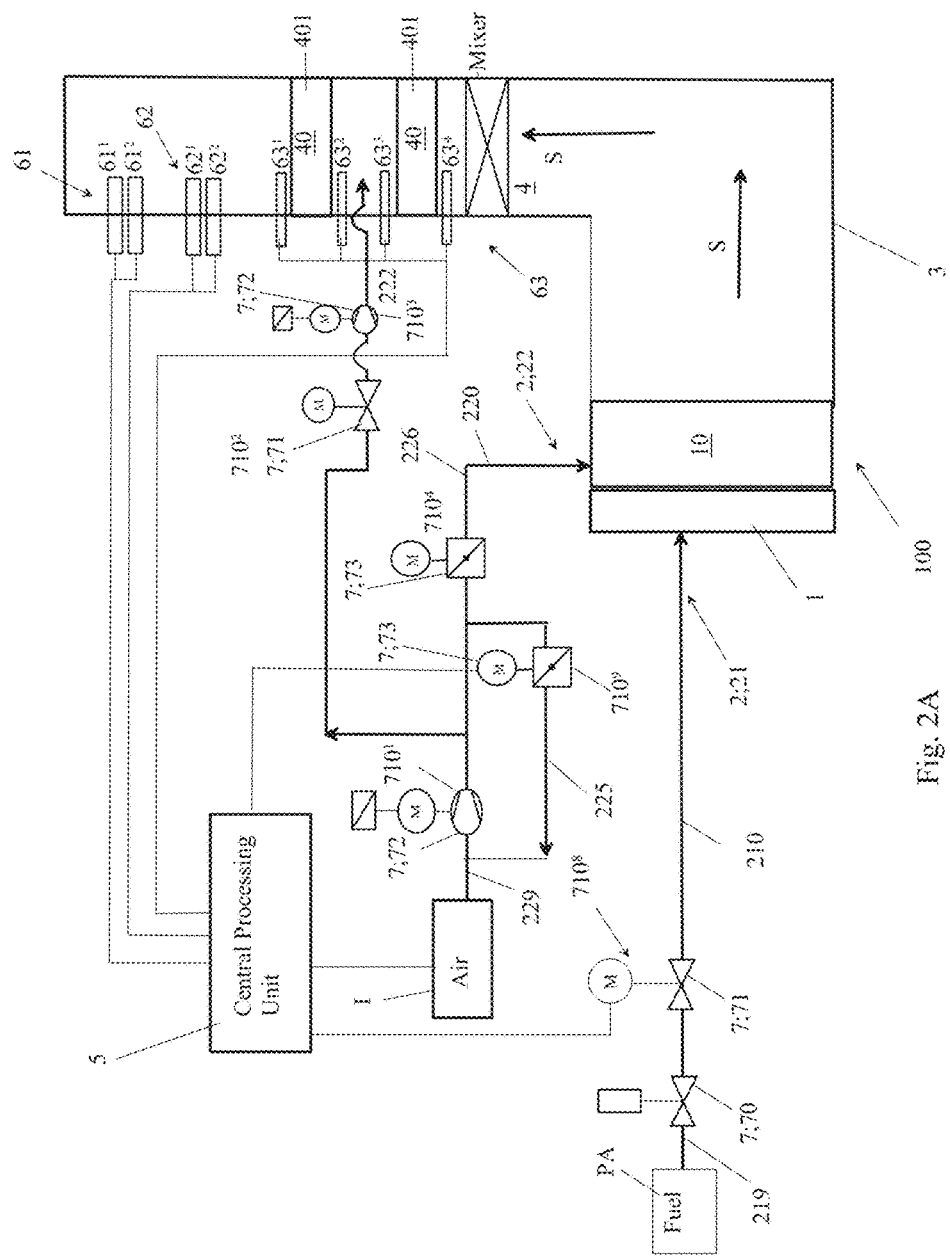
FIGS. 2A and 2B show likewise schematically another burner of the invention and burner automation employed therein and used for precisely adjusting the amount of combustion air.
Figure 3:
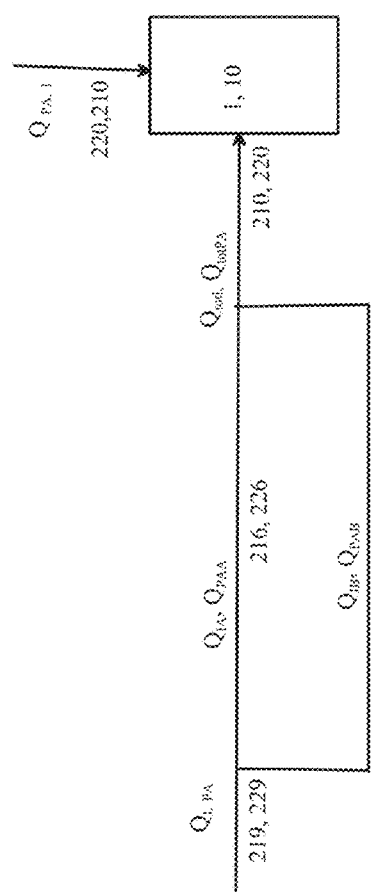
FIG. 3 illustrates flows of combustion air and fuel arriving at a combustion head and in a windbox in the burners of FIGS. 1 and 2.

FIGS. 1 and 2A are schematic views of burners according to the invention, wherein is implemented an adjustment of the invention for fuel and combustion air used for regulating the air/fuel ratio arriving in the flame. FIG. 3 shows in turn the fuel and combustion air flows of FIGS. 1 and 2A.

Figure 2B:
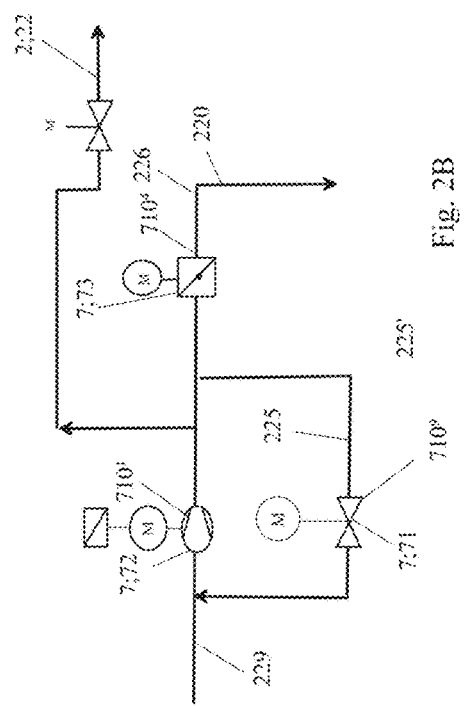

FIG. 2B shows an alternative implementation for a secondary inlet flow of air.

Next follows a brief survey of the main structures and functions shown in FIGS. 1-3.

Each of FIGS. 1 and 2A shows a burner 100, which is intended for a gaseous or liquid fuel such as natural gas or fuel oil. The burner 100 comprises a combustion head 1 located in connection with a windbox 10, physically downstream of said cabinet, as well as a boiler 3 which is associated with the windbox 10 and opens into a flue gas conduit 4.

The boiler 3 or the flue gas conduit 4 is provided with one three-way catalytic converter 401 with one catalytic zone 40. In this case, the three-way converter 401 of the boiler 3 or the flue gas conduit 4 comprises two catalytic zones 40 for the afterburning of gases generated in thermal combustion conducted in the boiler 3. It is possible to deliver supplementary air into a space between the catalytic zones 40 or between series of catalytic converters 40 by way of an extra supply conduit 222. The catalytic converter 401 is a three-way catalytic converter, which is selected in view of being suitable for the catalytic burning of combustion gases and for the reduction of NOx's generated in thermal combustion conducted with the combustion head 1 and the windbox 10 associated therewith and for the oxidation of hydrocarbon as well as carbon monoxide emissions in resulting flue gases.

By delivering supplementary combustion air between the first and the second catalytic zones of said three-way catalytic converter one can adjust very quickly to variation in the amount of NOx and CO in the flue gas arriving said catalyst.

Figure 4:
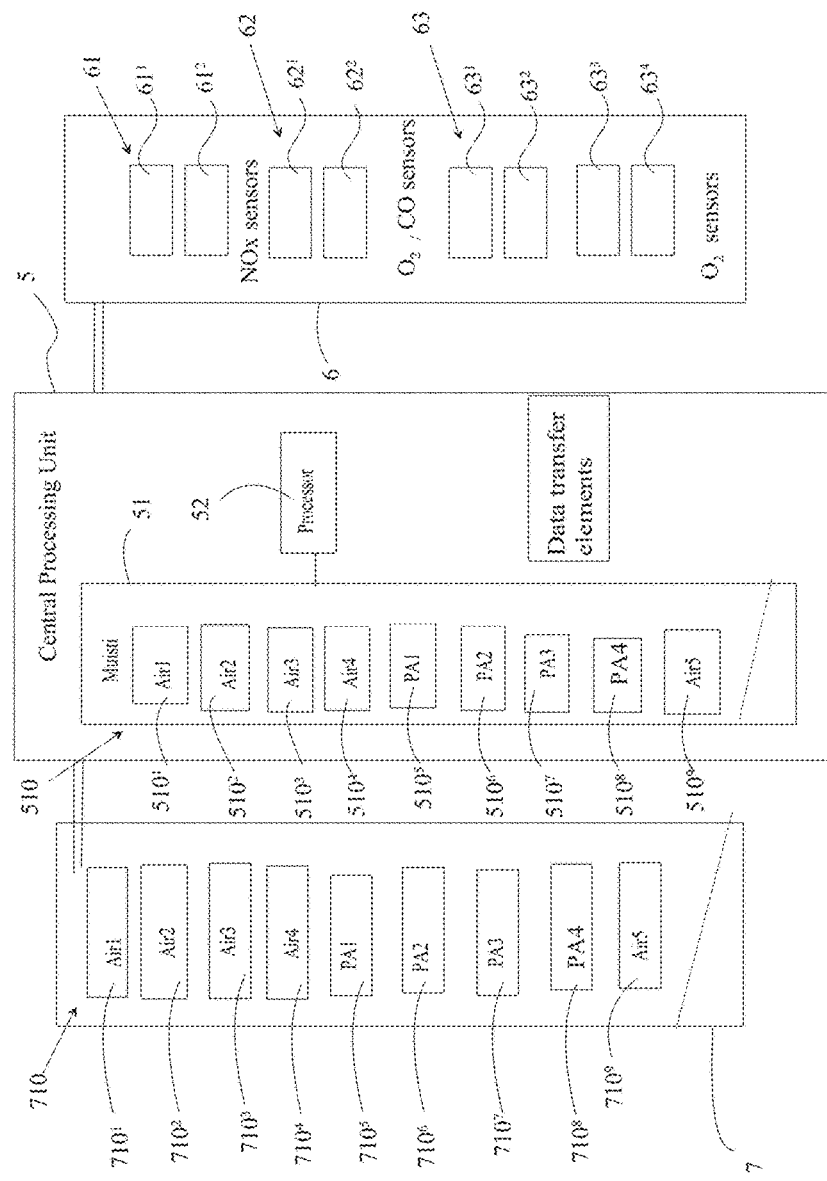
FIG. 4 shows a more detailed view of burner automation employed in a burner of the invention.

In addition, the burner 100 includes burner automation 5, 6, 7 whose operation is more closely illustrated in FIG. 4.

As can be seen from FIGS. 1 and 2A, it is possible that the flue gas conduit 4, upstream of the catalytic zone 40 in the flowing direction of flue gas S, be supplied with combustion air I by way of an opening in a wall of the flue gas conduit 4. If desired, it is by way of the flue gas conduit that the exterior of the flame could also be supplied with fuel PA. In the burners shown in FIGS. 1 and 2A, the catalytic zone 40 comprises two three-way catalytic converters 401, which are successive in the traveling direction of flue gases and which enable oxides of nitrogen to be reduced, as well as unburned hydrocarbons (VOC) and carbon monoxide (CO) to be oxidized. It is possible that into a space between these is introduced supplementary air by way of an extra combustion air supply conduit 222.

In FIGS. 1 and 2A is presented also a mixer after the combustion chamber in the flue gas conduit before the first catalytic zone of first three-way catalytic converter, in the flow direction of flue gases. This mixer is intended for acquiring a homogenized flue gas mixture before delivering it to said catalytic converter. In FIG. 7 is presented one possible static mixer structure.

In FIGS. 1, 2A and 4 can also be seen a central unit 5 of burner automation and measuring instruments 6 for collecting information about the combustion process to be controlled, as well as various actuators 7 which are controlled by the burner automation. In burners 100 visible in FIGS. 1 and 2, the measuring instruments 6 include at least a plurality of lambda sensors 63; $63^1$, $63^2$, $63^3$, $63^4$, which measure the amount of residual oxygen in flue gases (the oxidation/reduction potential of flue gas) and which are located upstream and downstream of the three-way catalytic converter 401 with two catalytic zones 40, 40. There are also two lambda sensors between said catalytic zones 40, 40 and the first is just before said extra air supply conduit 222 opening between catalytic zones 40, 40 in an arrow-indicated traveling direction of the flue gases S. The measuring instruments 6 further include sensors 61; $61^1$, $61^2$, which are located downstream of the catalytic zones 40,40 in a traveling direction of the flue gases S and which measure the amount of nitrogen oxides NOx from flue gases, and/or sensors 62; $62^1$, $62^2$ which measure the amount of carbon monoxide from flue gases. These sensors are located downstream of the catalytic zone 40 in the flowing direction of flue gases and, as a result, are used for measuring NOx and CO emissions in the flue gas conduit 4 after the catalytic converters 401.

It is by way of a supply conduit 210 for fuel PA, opening onto the combustion head 1, that the combustion head 1 is supplied with a given fuel inlet flow $Q_{PA}$ or $Q_{PAtot}$ (cf. FIG. 3), i.e. a given volume flow of fuel per unit time. On the other hand, it is a supply conduit 220 for combustion air I that supplies the windbox 10 with a given combustion air inlet flow $Q_I$ or $Q_{Itot}$, i.e. a given volume flow of combustion air per unit time.

In the burner 100 according to a first embodiment of the invention, shown in FIG. 1, the combustion head 1 is supplied by way of a fuel supply conduit 210 with a total fuel inlet flow $Q_{totPA}$. The total inlet flow $Q_{totPA}$ consists of two separately adjusted inlet flow portions $Q_{PAA}$, $Q_{PAB}$ (cf. FIGS. 1 and 3), which proceed by way of separate fuel transfer pipe systems 215,216 into the supply conduit 210.

The first inlet flow portion $Q_{PAA}$ comprises a so-called primary inlet flow, which is adapted to travel in a first section 216 of the transfer pipe system that is in fluid communication with the supply conduit 210, and which makes up 70-100% of the inlet flow, preferably 80-100% of the total inlet flow $Q_{totPA}$. The primary inlet flow $Q_{PAA}$ has its rate regulated with an actuator-equipped control valve, such as with a servo motor-operated control valve 7; 71.

The second inlet flow portion comprises a secondary inlet flow $Q_{PAB}$, which is adapted to travel in a second section 215 of the transfer pipe system that is likewise in fluid communication with the supply conduit 210, and which makes up 0-30% of the total inlet flow, preferably 0-20% of the total inlet flow $Q_{totPA}$ (cf. FIGS. 1, 3). The rate adjustment for the secondary inlet flow $Q_{PAB}$ of fuel in the second section 215 of the transfer pipe system takes place by means of at least one actuator-equipped control valve 7; 71, and further preferably by means of at least one actuator-equipped on/off valve 7; 70 such as a magnet-operated on/off valve. In an implementation of the invention shown in FIG. 1, the secondary inlet flow $Q_{PAB}$ has its rate regulated with two servo motor-operated control valves 7; 71 and with one on/off solenoid valve (check valve) 7; 70.

In an exemplary embodiment of the invention shown in FIG. 1, the combustion air proceeds by way of a transfer pipe system 229 and a supply conduit 220 into the windbox 10. It is possible to regulate the amount of combustion air arriving in the windbox 10 with one or more blowers 7; 72, as well as with dampers 7; 73 having an adjustable opening degree. To the blower 7; 72 in the transfer pipe system 229 is connected a frequency transformer by which the rotational speed of the blower can be adjusted, depending on the blower utilization degree, i.e. on the rate of a combustion air flow $Q_I$, $Q_{Itot}$ to be delivered into the windbox. Visible in FIG. 1 is also a supplementary air transfer pipe system 222 by which it is possible to introduce supplementary air to the catalytic zone 40 of the flue gas conduit 4 into a space between the catalytic converters 401 and 401. The introduction of supplementary air in the transfer pipe system 222 is regulated with the actuator-equipped control valve 7; 71, as well as with the blower 7; 72 which is located in the air flowing direction downstream thereof and which can be fitted with an inverter.

The burner according to the exemplary embodiment shown in FIG. 1 is adjusted as follows.

The amount of a combustion air inlet flow QI arriving in the windbox 10 is regulated with burner automation 5, 6, 7 (cf. FIG. 4), and particularly with one or more blowers 7; 72 present in a combustion air transfer pipe system 229, as well as with dampers 7; 73 having an adjustable opening degree. The adjustment of the combustion air inlet flow $Q_I$ is based on a predetermined amount of residual oxygen $O_2$ in flue gases S, preferably on the amount of 1-2.5% residual oxygen in flue gases S. This indicates that the adjustment of the amount of combustion air is based on estimating or determining by way of calculation how much combustion air should be introduced when, with a given utilization rate of the burner, it is desirable to reach the amount of 1-2.5% residual oxygen in flue gas prior to a catalytic zone.

The amount of a primary inlet flow $Q_{PAA}$ of fuel is regulated by means of burner automation 5, 6, 7 and an actuator-equipped control valve, such as an electric motor-operated control valve 7; 71, present in a first transfer pipe system 116, likewise on the basis of a predetermined amount of residual oxygen in flue gases S, preferably on the amount of 1-2.5% residual oxygen in flue gases. This indicates that the adjustment of the primary inlet flow $Q_{PAA}$ of fuel is based on estimating or determining by way of calculation how much fuel should be introduced with a given utilization rate of the burner when it is desirable to reach the amount of 1-2.5% residual oxygen in flue gas prior to the catalytic zone 40.

The secondary inlet flow $Q_{PAB}$ of fuel is regulated by means of burner automation 5, 6, 7 and actuators 7 present in a second transfer pipe system 215, i.e. by way of two actuator-equipped control valves such as servo motor-operated control valves 7; 71 and one actuator-equipped on/off valve such as an on/off solenoid valve 7; 70 present in a section of the transfer pipe system 215.

The adjustment of the secondary inlet flow $Q_{PAB}$ of fuel is based on the amount of residual oxygen measured with a lambda sensor 63 from flue gases, by way of which the burner automation 5, 6, 7 regulates the secondary inlet flow $Q_{PAB}$, of fuel, which combines with a total inlet flow $Q_{PAtot}$ of fuel arriving by way of a supply conduit 210 at the combustion head 1, such that the ratio of the (total) inlet flow $Q_{PAtot}$ of fuel arriving at the combustion head 1 to the combustion air flow $Q_I$ arriving in the windbox is such that said amount of residual oxygen is 0.010-0.50%, preferably 0.01-0.25%, in flue gases S prior to the first catalytic zone 40 of the three-way converter 401.

The burner embodiment shown in FIG. 2A differs from that presented in FIG. 1 principally in the sense that this time the combustion air inlet flow $Q_{Itot}$, arriving in the windbox 10 by way of a combustion air supply conduit 220, is adapted to consist of two separately adjusted portions of inlet flow $Q_{IA}$, $Q_{IB}$ proceeding by way of a combustion air transfer pipe system 225, 226 into the supply conduit 220. The total combustion air flow $Q_{totI}$, arriving in the windbox 10, is now composed the same way as the total inlet flow $Q_{totPA}$ of fuel in the exemplary embodiment of FIG. 1, i.e. consists of two separate combustion air flows, just one of which, i.e. the secondary inlet flow of combustion air, is adjusted in a manner involving feedback.

The first portion $Q_{IA}$ of a combustion air inlet flow comprises a primary inlet flow $Q_{IA}$ of combustion air, which is adapted to travel in a first section 226 of the transfer pipe system that is in fluid communication with the supply conduit 220, and which makes up 70-100%, preferably 80-100%, of the combustion air inlet flow $Q_{totI}$. The rate adjustment for the primary inlet flow $Q_{IA}$ of combustion air takes place by means of burner automation 5, 6, 7 (cf. FIG. 4) and an actuator 7, such as an actuator-equipped control valve, for example a servo motor-operated control valve 7; 71, present in the first transfer pipe system.

The second portion $Q_{IB}$ of a combustion air inlet flow comprises a secondary inlet flow, which is adapted to travel in a second section 226 of the transfer pipe system that is in fluid communication with the supply conduit 220, and which makes up 0-30%, preferably 0-20%, of the combustion air inlet flow $Q_{Itot}$. The rate adjustment for the secondary inlet flow $Q_{IB}$ of combustion air takes place by means of burner automation 5, 6, 7 and actuators 7 present in the second transfer pipe system 225.

In an implementation of the invention shown in FIG. 2A, the rate adjustment for the secondary inlet flow $Q_{IB}$ of combustion air traveling in a line 215 takes place reversely to the adjustment of the secondary inlet flow $Q_{PAB}$ of fuel. The adjustment of the secondary inlet flow $Q_{IB}$ of combustion air is based on a procedure that, in order to attain a stoichiometric ratio between fuel and oxygen, the secondary inlet flow $Q_{IB}$ of air is restricted in normal condition with an appropriate actuator 7, such as an actuator-equipped control valve or a damper, constricting the secondary inlet flow $Q_{IB}$ of combustion air, and the secondary inlet flow $Q_{IB}$ is returned to an intake side of the blower 7; 72.

The adjustment of a (primary) inlet flow $Q_{IA}$ of combustion air is similar to the adjustment of a fuel inlet flow $Q_{PA}$ shown in the exemplary embodiment of FIG. 1. Thus, the adjustment is based on estimating or determining by way of calculation how much the combustion air inlet flow $Q_{IA}$ to the combustion head 1 should be with a given burner utilization rate in order to attain the amount of 1-2.5% residual oxygen in flue gas prior to first the catalytic zone 40 of two three-way catalytic converters 401 with one catalytic zone 40, 40 each.

On the other hand, the adjustment of a secondary inlet flow $Q_{IB}$ of combustion air is based on the amount of residual oxygen, which has been measured from flue gases S prior to the first catalytic zone 40, and by way of which the burner automation 5, 6, 7 regulates the secondary inlet flow $Q_{IB}$, of combustion air which travels through the second transfer pipe system 225 and which changes the amount of a combustion air inlet flow $Q_{Itot}$ arriving in the windbox 10 by way of a supply conduit 220.

The secondary combustion air inlet flow $Q_{IB}$ can be adjusted for example in such a way that the amount of combustion air, returned in normal condition by way of the second transfer pipe system 225 to an intake side of the blower 7; 72, will be constricted with an appropriate actuator 7 present in the transfer pipe system. Such an actuator can be for example an extra damper 7; 73 shown in the exemplary embodiment of FIG. 2A.

There are also other options for constricting the amount of combustion air in the second transfer pipe system 225, whereby the second transfer pipe system 225 may include for example a return branch 225' used for returning air by way of an appropriate actuator-equipped control valve 7; 71 to the intake side of a blower 7; 72 present in a main line 229, as shown in FIG. 2B.

In a minor malfunction, the amount of air traveling by way of the transfer pipe system 225 is increased by increasing constriction of the secondary inlet flow $Q_{IB}$.

Therefore, the adjustment of the secondary inlet flow $Q_{IB}$ of combustion air is based on the amount of residual oxygen measured with lambda sensors 63 from flue gases S upstream of the second catalytic zone 40 (in the traveling direction of flue gases after first catalytic zone.). Based on this, the burner automation 5, 6, 7 regulates the secondary inlet flow $Q_{IB}$ of combustion air, which changes the amount of a total inlet flow $Q_{totI}$ of combustion air arriving in the windbox 10 by way of a supply conduit 220. The adjustment takes place in such a way that the ratio of the (total) inlet flow $Q_{totI}$ of combustion air (secondary inlet flow $Q_{IB}$ of combustion air+primary inlet flow $Q_{IA}$ of combustion air) to the total inlet flow $Q_{PA}$ of fuel arriving at a combustion head remains to be such that the measured amount of residual oxygen is 0.01-0.50% preferably 0.01-0.25% in flue gases S upstream of the first catalytic zone 40.

The exemplary embodiments of both FIG. 1 and FIG. 2 are provided not only with lambda sensors 63 located upstream, downstream or at the three-way catalytic converter but also with CO sensors measuring the amount of carbon monoxides as well as with NOx sensors 61 measuring the amount of nitrogen oxides NOx in a flue gas conduit 4 downstream of the three-way catalytic converter 401 in the traveling direction of flue gases. The measurements conducted with these CO and NOx sensors 61, 62 provide a basis for further specifying the rates of the secondary inlet flows $Q_{PAB}$ and $Q_{IB}$ of fuel or combustion air in respective transfer pipe systems 215, 225.

The burner automation according to the invention is in turn elucidated by FIG. 4.

The burner 100 according to the invention is provided with integrated burner automation. The burner automation comprises a central processing unit 5, measuring instruments 6, and data transfer elements for providing appropriate control instructions 710 for operating actuators 7 which control the supplies of fuel PA and combustion air I for the burner 100.

The central processing unit comprises a processor 52 and at least one memory element 51. The memory elements 51 contain various software products 510 for controlling the burner operation, especially for adjusting the total amounts $Q_I$, $Q_{Itot}$, $Q_{PA}$, $Q_{totPA}$ of air and fuel as well as for regulating the primary and secondary inlet flows $Q_{PAA}$, $Q_{PAB}$, $Q_{IA}$, $Q_{IB}$ of fuel or air by means of respective actuators present in transfer and supply pipe systems. FIG. 4 displays software products $510^1$-$510^9$, which are used for adjusting respectively the actuators visible in FIGS. 1, 2 and 4 by way of control instructions $710^1$-$710^9$.

The software products $510^1$-$510^4$ are associated with control instructions $710^1$-$710^4$, which are used for controlling the supply of air I to the windbox 10 and a supplementary inlet flow in a pipe system 222 into the flue gas conduit 4 by way of actuators 7. In the exemplary embodiment according to FIG. 1, the supply of combustion air to the windbox 10 is controlled by a blower 7; 72 as well as by a damper 7; 73 by way of control instructions $710^4$ as well as $710^1$, and the air supply of the supplementary air inlet flow in the transfer pipe system 222 into the flue gas conduit 4 is controlled by an actuator-equipped control valve 7; 71 as well as an inverter-controlled blower 7; 72 by way of control instructions $710^2$ and $710^3$.

The software products $510^5$-$510^8$, on the other hand, are associated with control instructions $710^5$-$710^8$ to be established for adjusting the supply of fuel PA by way of respective actuators 7. In the exemplary embodiment according to FIG. 1, the control instruction $710^8$ is used for adjusting a control valve 7; 71 in a section 216 of the transfer pipe system for the primary inlet flow $Q_{PAA}$ of fuel (FIG. 1) or an actuator-equipped control valve 7; 71 in a transfer pipe system 219 for the total inlet flow $Q_{PA}$ (FIG. 2).

The control instructions $710^5$, $710^6$, $710^7$, on the other hand, are used for adjusting the secondary inlet flow $Q_{PAB}$ of fuel by way of actuators 7 present in a second section 215 of the transfer pipe system. Said actuators of the transfer pipe system's section 215 include two actuator-equipped control valves 7; 71 and one actuator-equipped on/off check valve 7; 70.

The control instruction $710^9$ is generated by software products $510^9$ associated with the supply of combustion air. These software products and control instructions are related to the adjustment of a secondary inlet flow $Q_{PIB}$ of combustion air. The adjustment of secondary inlet flow is elucidated in the exemplary embodiments of FIGS. 2A and 2B in a second section 225 of the transfer pipe system for combustion air. The adjustment takes place by way of an actuator 7, such as a damper 7; 73 (FIG. 2A), or by way of a return line 225' and an actuator-equipped control valve 7; 71 (FIG. 2B), as described above.

The measuring instruments 6 of burner automation are used for gathering information about the combustion process of a burner 100. Visible in an embodiment of the invention shown, in FIG. 4 are lambda sensors 63; 63$^1$, 63$^2$, 63$^3$, 634 measuring residual oxygen, CO sensors 62; 62$^1$, 62$^2$ measuring the amount of carbon monoxides, as well as NOx sensors 61; 61$^1$, 61$^2$ measuring the amount of nitrogen oxides NOx. The lambda sensors 63 are located upstream, downstream or at the three-way catalytic converter 401 with two catalytic zones in the traveling direction of flue gases S, the carbon monoxide sensors 62 as well as the nitrogen oxide sensors 61 being present downstream of the second catalytic zone 40.

The data transfer elements are used for collecting measurement data from the measuring instruments 6 and for communicating the same to a processor 52 of the central processing unit 5 and to software products 510, comprising the reception of a data item regarding the amount of residual oxygen $O_2$ from the lambda sensors 63; 63$^1$-63$^4$ which are present in flue gases and measure the oxidation/reduction potential of a flue gas and from the CO sensors 62; 62$^1$, 62$^2$ which measure the amount of carbon monoxides, as well as from the NOx sensors 61; 61$^1$, 61$^2$ which measure the amount of nitrogen oxides NOx.

The transfer elements supply the processor 5; 52 as well as the burner control software 510 with the measurement data collected from the sensors 6. The burner control software 510 as well as the central processing unit 5 provide control instructions 710 for actuators 7 used for regulating the amount of air I and fuel PA.

In one preferred exemplary embodiment of the invention, which illustrated by FIG. 1, the central processing unit 52 is adapted by way of the burner control software 510 to generate control instructions as follows:

1) the control instructions 710$^5$, 710$^6$, 710$^7$ relating to the amount of a secondary fuel inlet flow $Q_{PAB}$ and used for regulating the secondary fuel inlet flow $Q_{PAB}$ in such a way that the amount of secondary inlet flow $Q_{PAB}$ in a fuel inlet flow $Q_{totPA}$ to be delivered to a combustion head (1) is such that the amount of residual oxygen is is 0.01-0.50%, preferably 0.01-0.25% in flue gases prior to a catalytic zone.

These control instructions 710$^5$, 710$^6$, 710$^7$ are used for controlling the operation of actuators which regulate the rate of a secondary fuel inlet flow. The actuators are located in a pipe system 215 for the secondary inlet flow, and these include for example an actuator-equipped control valve 7; 71 such as a servo motor-operated control valve, as well as an actuator-equipped on/off valve such as an on/off solenoid valve 7; 70 (a check valve).

2) the control instructions 710$^8$ relating to the amount of a primary fuel inlet flow $Q_{PAA}$ and based on a predetermined amount of residual oxygen in flue gases S, preferably on the amount of 1-2.5% residual oxygen in flue gases 40.

The control instruction 710$^8$ is used for controlling the operation of an actuator 7 which regulates the amount of primary inlet flow with an actuator-equipped control valve 7; 71, such as a servo motor-operated control valve.

3) the control instructions 710$^1$, 710$^4$ used for the inlet flow of combustion air I and for regulating the amount of a combustion air inlet flow $Q_I$ arriving in an windbox 10 by way of a combustion air supply conduit 220, based on a predetermined amount of residual oxygen in flue gases S, preferably the amount of 1-2.5% residual oxygen in flue gases.

The control instructions 710$^1$, 710$^4$ are used for controlling by way of actuators 7 the amount of combustion air I arriving in the windbox 10, said actuators being preferably a blower 7; 72 as well as a damper 7; 73, the former regulating said amount of combustion air in a combustion air transfer pipe system 229 and being fitted with an inverter.

The invention also encompasses the following examples:

1. An arrangement for reducing NOx and CO gases from flue gases of a industrial burner, said arrangement comprising in combination:
    an industrial burner (100) adapted to burn gaseous and/or liquid fuel by adjusting the ratio between supplied amounts of fuel (PA) and air (I) in the burner (100), said burner comprising
    a fuel and air mixing zone,
    a fuel supply conduit (210) adapted to supply the mixing zone with a given inlet flow of fuel,
    a combustion air supply means adapted to supply the mixing zone with a given inlet flow of combustion air,
    a burner automation containing measuring instruments (6) including at least one lambda sensor (63) for measuring amount of residual oxygen in flue gases (flue gas oxidation/reduction potential),
    said burner having the mixing zone accompanied by a combustion chamber which is in communication with measuring instruments of flue gas conduit, said combustion chamber or flue gas conduit being provided with at least one three way catalytic converter with at least two catalytic zones (40),
    wherein adjustment for an inlet flow ($Q_I$, $Q_{Itot}$) of combustion air generated by the combustion air (I) supply means (determined as a volume flow per unit time), as well as the adjustment for an inlet flow ($Q_{PA}$, $Q_{PAtot}$) of fuel arriving in the mixing zone by way of the fuel supply conduit (210) (determined as a volume flow per unit time), by means of burner automation (5, 6, 7), is based on the amount of residual oxygen measured from flue gases (S) with the measuring instrument (63), by way of which the burner automation adjusts the relative ratio between said inlet flow ($Q_I$, $Q_{Itot}$) of combustion air as well as the inlet flow ($Q_{PA}$, $Q_{PAtot}$) of fuel in such a way that the amount of residual oxygen is within the range of 0.01-0.50% preferably within the range of 0.01-0.25% in flue gases prior to the catalytic zone (40),
    after the combustion chamber in the flue gas conduit or heat exchange area after combustion chamber, before the first catalytic zone of at least one three-way catalytic converter (s), in the flow direction of flue gases, is located a mixer for acquiring a homogenized flue gas mixture before delivering it to said catalytic converter (s).

2. The arrangement defined in Example 1 wherein in said homogenized flue gas mixture difference between maximal $CO/O_2$-ratio (both in moles/m$^3$) to minimal $CO/O_2$ ratio (both in moles/m$^3$) in flue gas flow, penetrating a cross section of said flue gas conduit or heat exchange area is less than 5% after said mixer.

3. The arrangement defined in Example 1 wherein mixer is installed at the combustion chamber or at the flue gas conduit so, that the mixer plane extends to the whole diameter of said heat exchange area after combustion chamber or the flue gas conduit and practically all flue gases flowing in said combustion chamber or flue gas conduit will penetrate said mixer plane.

4. The arrangement defined in Example 1 wherein the mixer is a static mixer for example plate mixer, throttling mixer, or a counter swirl mixer which are adapted to mix flue gas flow penetrating the mixer plane for acquiring a homogenized flue gas mixture as to $O_2/CO$-ratio.

5. An arrangement according to Example 1 wherein measuring instruments additionally comprise a CO sensor, that measures the amount of carbon monoxides, as well as the NOx sensor that measures the amount of nitrogen oxides (NOx) which CO sensor and NOx sensor are located upstream or downstream of the three-way catalytic converter with two catalytic zones (40, 40) or at least two three-way catalytic converter with one catalytic zone (40) in the flowing direction of flue gases (S).

6. An arrangement according to Example 1 wherein said three way catalytic converter (401) is located in flue gas conduit and comprises at least one three-way catalytic converter with two catalytic zones (40, 40) or at least two three-way catalytic converters with one catalytic zone (40) and between which catalytic zones (40, 40) opens an additional supply conduit (222) which enables delivering supplementary air between said catalytic zones (40,40).

7. An arrangement of Example 1 or 6 wherein said lambda sensor (63) is located after said first catalytic zone of the at least one three-way catalytic converter (401) or after said at least one three-way catalytic converter (401) in the flowing direction of flue gases (S).

8. An arrangement according to Example 1 wherein
the measuring instruments (6) include at least one lambda sensor (63), measuring the amount of residual oxygen in flue gases (flue gas oxidation/reduction potential),
the adjustment by means of burner automation (5, 6, 7) for an inlet flow ($Q_I$) of combustion air (I) arriving in the mixing zone is based on a predetermined amount of residual oxygen in flue gases (S), preferably on the amount of 1-2.5% residual oxygen in flue gases (S), and on the amount of combustion air (I) estimated or calculated on the basis thereof and to be delivered to the mixing zone, and
the fuel inlet flow ($_{totPA}$) arriving in the mixing zone by way of the fuel supply conduit (210) is adapted to consist of two separately regulated portions ($Q_{PAA}$, $Q_{PAB}$) of the fuel inlet flow, whereof the first portion ($Q_{PAA}$) of the inlet flow comprises a primary inlet flow which makes up 70-100% of the inlet flow, preferably 80-100% of the inlet flow, and whereof the second portion ($Q_{PAB}$) of the inlet flow comprises a secondary inlet flow which makes up 0-30% of the inlet flow, preferably 0-20% of the inlet flow, whereby
the adjustment of said primary inlet flow ($Q_{PAA}$) of fuel by means of burner automation (5, 6, 7) is based on a predetermined amount of residual oxygen in flue gases (S), preferably on the amount of 1-2.5% residual oxygen in flue gases, and on the amount of the primary inlet flow ($Q_{PAA}$) which is estimated or calculated on the basis thereof in the inlet flow ($_{totPA}$) of fuel (PA) to be delivered to the combustion head, and
the adjustment of said secondary inlet flow ($Q_{PAB}$) of fuel, by means of the burner automation (5, 6, 7), is based on the amount of residual oxygen measured from flue gases (S), by way of which the burner automation (5, 6, 7) adjusts the amount of the secondary inlet flow ($Q_{PAB}$) in the inlet flow ($Q_{totPA}$) of fuel to be delivered to the combustion head (1) such that the amount of residual oxygen is within the range of 0.01-0.50%, preferably within the range of 0.01-0.50% in flue gases prior to the first catalytic zone of at least one three-way catalytic converter (401).

9. An arrangement according to Example 1, characterized in that
the measuring instruments (6) include at least one lambda sensor (63) that measures the amount of residual oxygen in flue gases,
the adjustment by means of burner automation (5, 6, 7) for the amount ($Q_{PA}$) of a fuel inlet flow arriving in the mixing zone by way of the fuel supply conduit (210) is based on a predetermined amount of residual oxygen in flue gases (S), preferably on the amount of 1-2.5% residual oxygen in flue gases, and on the amount of fuel estimated on the basis thereof or to be delivered to the mixing zone, and
the inlet flow ($Q_{totI}$) of combustion air (I) arriving in the mixing zone is adapted to consist of two separately regulated portions of the combustion air inlet flow, whereof the first portion ($Q_{IA}$) of the inlet flow comprises a primary inlet flow which makes up 70-100% of the combustion air inlet flow ($Q_{totI}$), preferably 80-100% of the combustion air inlet flow ($Q_{totI}$), and whereof the second portion ($Q_{IB}$) of the inlet flow comprises a secondary inlet flow which makes up 0-30% of the combustion air inlet flow ($Q_{totI}$), preferably 0-20% of the combustion air inlet flow ($Q_{totI}$), whereby
the adjustment by means of burner automation (5, 6, 7) for the primary inlet flow ($Q_{IA}$) of combustion air is based on a predetermined amount of residual oxygen in flue gases (S), preferably on the amount of 1-2.5% residual oxygen in flue gases, and on the amount ($Q_{IA}$) of the primary inlet flow of combustion air estimated or calculated on the basis thereof in the combustion air inlet flow ($Q_{totI}$) to be delivered into the windbox (10), and
the adjustment by means of burner automation (5, 6, 7) for the amount ($Q_{IB}$) of a secondary inlet flow of combustion air (I) is based on the amount of residual oxygen measured from flue gases (S), by way of which the burner automation (5, 6, 7) adjusts the amount ($Q_{IB}$) of the secondary inlet flow of combustion air in the combustion air inlet flow ($Q_{totI}$) to be delivered into the windbox (10), such that the amount of residual oxygen is 0.01-0.50%, preferably 0.01-0.25%, in flue gases prior to the firs catalytic zone (40, 40) of at least one three-way catalytic converter.

10. An arrangement according to Example 8 or 9, characterized in that the burner (100) has its fuel and air mixing zone comprising a combustion head (1) which is supplied with fuel by way of a fuel supply conduit (210), and the combustion air supply means comprises a blower, which is coupled with the burner, for supplying the combustion head (1) with combustion air directly or by way of an air conduit (220).

11. An arrangement for reducing NOx and CO gases from the flue gases of a burner (100) by adjusting the ratio between supplied amounts of fuel (PA) and air (I) in a burner (100), which is intended for a gaseous and/or liquid fuel, said burner comprising a combustion head (1) in connection with an windbox (10), a fuel supply conduit (210) opening onto the combustion head (1) and adapted to supply the combustion head (1) with a given fuel inlet flow ($Q_{PA}$, $Q_{totPA}$), as well as a combustion air supply conduit (220) opening into the windbox (10) and adapted to supply the combustion head (1) with a given combustion air inlet flow ($Q_I$, $Q_{totI}$), fuel and combustion air transfer pipe systems (219, 215, 216, 229, 225, 226) which are in fluid communication with the respective fuel or combustion air supply conduits (210, 220), as well as burner automation (5, 6, 7) which contains measuring instruments (6), the windbox of said burner being accompanied by a combustion chamber, especially a boiler (3), which opens into a flue gas conduit (4), said combustion chamber or flue gas conduit (4) being provided with at least two catalytic zones (40) of one three-way converter (401) or one catalytic zone of two successive three-way catalytic converters (401, 401) wherein the measuring instruments (6) include at least one lambda sensor (63), which measures the amount of residual oxygen in flue gases (S) (flue gas oxidation/reduction potential), the adjustment by means of burner automation (5, 6, 7) for the combustion air inlet flow ($Q_I$, $Q_{totI}$) arriving in the windbox (10) by way of the combustion air supply conduit (220), as well as for the fuel inlet flow ($Q_{PA}$, $Q_{totPA}$) arriving at the combustion head (1) by way of the fuel supply conduit (210), is based on the amount of residual oxygen measured from flue gases (S) with the measuring instrument (63), on the basis of which the burner automation (5, 6, 7) regulates by means of actuators (7) the relative ratio between said combustion air inlet flow ($Q_I$, $Q_{totI}$) as well as the fuel inlet flow ($Q_{PA}$, $Q_{totPA}$) in such a way that the amount of residual oxygen is within the range of 0.05-0.50%, in flue gases prior to the first catalytic zone of at least one three-way catalytic converter (401), at least one three-way catalytic converter have at least two catalytic zones (40, 40) or two successive three-way catalytic converters (401, 401) have at least one catalytic zone of which are successive in the progressing direction of flue gases and between which zones (40, 40) it is possible to deliver supplementary combustion air by way of an additional supply conduit (222) of air arriving in the flue gas conduit (4)

before said first catalytic zone of at least one three-way catalytic converter(s) (401) in the flow direction of flue gases is located a mixer for acquiring homogenized flue gas mixture before delivering flue gases into said catalytic converter.

12. An arrangement according to Example 11, wherein the burner (100) comprises a combustion head (1) in connection with an windbox (10), a fuel supply conduit (210) opening onto the combustion head (1) and adapted to supply the combustion head (1) with a given fuel inlet flow ($Q_{totPA}$) (i.e. volume flow per unit time), as well as a combustion air supply conduit (220) opening into the windbox (10) and adapted to supply the windbox (1) with a given combustion air inlet flow ($Q_I$), fuel and combustion air transfer pipe systems (215, 216, 229) which are in fluid communication with the respective fuel or combustion air supply conduits (2; 210, 220), as well as burner automation (5, 6, 7) which contains measuring instruments (6), the windbox (1) of said burner being accompanied by a boiler (3), which opens into a flue gas conduit (4), said boiler (3) or flue gas conduit (4) being provided with at least one catalytic zone (40), wherein the measuring instruments (6) include at least one lambda sensor (63), which measures the amount of residual oxygen in flue gases (S) (flue gas oxidation/reduction potential), the adjustment by means of burner automation (5, 6, 7) for the inlet flow ($Q_I$) of combustion air (I) arriving in the air chamber (10) by way of the combustion air supply conduit (2; 220) is based on a predetermined amount of residual oxygen in flue gases (S), preferably on the amount of 1-2.5% residual oxygen in flue gases, and on the amount of combustion air estimated by means of burner automation (5, 6, 7) on the basis thereof or to be delivered into the windbox (10), and the fuel inlet flow ($Q_{totPA}$) arriving at the combustion head (1) by way of the fuel supply conduit (210) is adapted to consist of two separately adjusted portions ($Q_{PAA}$, $Q_{PAB}$) of the inlet flow traveling by way of the fuel transfer pipe system (215, 216) into the supply conduit (210), whereof the first portion ($Q_{PAA}$) of the inlet flow comprises a primary inlet flow, which is adapted to travel in a first section (216) of the transfer pipe system that is in fluid communication with the supply conduit (210), and which makes up 70-100% of the inlet flow, preferably 80-100% of the inlet flow ($Q_{totPA}$), and whereof the second portion of the inlet flow comprises a secondary inlet flow ($Q_{PAB}$), which is adapted to travel in a second section (215) of the transfer pipe system that is likewise in fluid communication with the supply conduit (210), and which makes up 0-30% of the inlet flow, preferably 0-20% of the inlet flow ($Q_{totPA}$), whereby the adjustment for said primary inlet flow ($Q_{PAA}$) of fuel adapted to travel in the first section (216) of the transfer pipe system takes place by means of burner automation (5, 6, 7) and an actuator (7), such as an actuator-equipped control valve (7; 71), present in the first transfer pipe system, and is based on a predetermined amount of residual oxygen in flue gases (S), preferably on the amount of 1-2.5% residual oxygen in flue gases, and on the amount ($Q_{PAA}$) of the primary inlet flow, which is estimated or calculated on the basis thereof and which combines by way of the supply conduit (210) with the fuel inlet flow ($Q_{totPA}$) to be delivered to the combustion head (1), and the adjustment for said secondary inlet flow ($Q_{PAB}$) of fuel adapted to travel the second section (215) of the transfer pipe system takes place by means of burner automation (5, 6, 7) and actuators, such as an actuator-equipped control valve (7; 70, 71), present in the second transfer pipe system, and is based on the amount of residual oxygen measured from flue gases (S), by means of which the burner automation (5, 6, 7) adjusts the secondary inlet flow ($Q_{PAB}$) of fuel which combines with the fuel inlet flow ($Q_{totPA}$) arriving at the combustion head (1) by way of the supply conduit (210), such that the amount of residual oxygen is 0.01-0.50%, preferably within the range of 0.01-0.25%, in flue gases prior to the first catalytic zone of at least one three-way catalytic converter (401).

13. An arrangement according to Example 12, wherein the burner (100) comprises a combustion head (1) in connection with an windbox (10), a fuel supply conduit (210) opening onto the combustion head (1) and adapted to supply the combustion head (1) with a given fuel inlet flow ($Q_{PA}$), as well as a combustion air supply conduit (220) opening into the windbox (10) and adapted to supply the windbox with a given combustion air inlet flow (i.e. volume flow per unit time), fuel and combustion air transfer pipe systems (219, 229) which are in fluid communication with the respective fuel or combustion air supply conduits (210, 220), and burner automation which contains measuring instruments (6), wherein the burner (100) has its combustion head (1) accompanied by a boiler (3) which opens into a flue gas conduit (4), said boiler (3) or flue gas conduit (4) being provided with at least one three-way catalytic converter having at least two catalytic zones (40,40) or with at least two three-way catalytic converters (401, 401) which are successive in the progressing direction of flue gases and each converter (401) having at least one catalytic zone (40), wherein the adjustment by means of burner automation (5, 6, 7) for the fuel inlet flow ($Q_{PA}$) arriving at the combustion head (1) by way of the fuel air supply conduit (210) and transfer pipe system (229) is based on a predetermined amount of residual oxygen in flue gases (S), preferably on the amount of 1-2.5% residual oxygen in flue gases, and on the amount of fuel estimated on the basis thereof and to be delivered to the combustion head (1), and the combustion air inlet flow ($Q_{totI}$) arriving in the windbox (10) by way of the combustion air supply conduit (220) is adapted to consist of two separately adjusted portions ($Q_{IA}$, $Q_{IB}$) of the inlet flow traveling by way of the combustion air transfer pipe system (225, 226) into the supply conduit (220), whereof the first portion ($Q_{IA}$) of the inlet flow comprises a primary inlet flow, which is adapted to travel in a first section (226) of the transfer pipe system that is in fluid communication with the supply conduit (220), and which makes up 70-100% of the inlet flow, preferably 80-100%, of the combustion air inlet flow ($Q_{totI}$), and whereof the second portion ($Q_{IB}$) of the inlet flow comprises a secondary inlet flow, which is adapted to travel in a second section (226) of the transfer pipe system that is likewise in fluid communication with the supply conduit (220), and which makes up 0-30% of the inlet flow, preferably 0-20%, of the total inlet flow ($Q_{totI}$) of combustion air, whereby the adjustment for the amount of said primary inlet flow ($Q_{IA}$) of combustion air adapted to travel in the first section (226) of the transfer pipe system takes place by means of burner automation (5, 6, 7) and an actuator (7), such as an amount control valve, present in the first transfer pipe system, and is based on a predetermined amount of residual oxygen in flue gases (S), preferably on the amount of 1-2.5% residual oxygen in flue gases, and on the amount of the primary inlet flow ($Q_{IA}$) of combustion air, which is estimated or calculated on the basis thereof and which combines by way of the supply conduit (220) with the combustion air inlet flow ($Q_{totI}$) to be delivered into the windbox (10), and the adjustment for the amount of said secondary inlet flow ($Q_B$) of combustion air adapted to travel the second section (225) of the transfer pipe system takes place by means of burner automation (5, 6, 7) and actuators, such as an actuator-equipped control valve (7; 70, 71) and an actuator-equipped check valve (7; 71), present in the second transfer pipe system, and is based on the amount of residual oxygen measured from flue gases (S), by means of which the burner automation (5, 6, 7) adjusts the secondary inlet flow ($Q_{IB}$) of combustion air traveling by way of the second transfer pipe system (215), which changes the inlet flow ($Q_{totI}$) of combustion air arriving in the windbox (10) by way of the supply conduit (220), such that the amount of residual oxygen is 0-0.50%, preferably within the range of 0.01-0.25%, in flue gases prior to the catalytic zone (40).

14. The arrangement defined in Example 11 wherein in said homogenized flue gas mixture difference between maximal $CO/O_2$ ratio (both in moles/m³) to minimal $CO/O_2$ ratio (both in moles/m³) in flue gas flow, penetrating a cross section of said flue gas conduit or heat exchange area is less than 5% after said mixer.

15. The arrangement defined in Example 11 wherein mixer is installed at the combustion chamber or at the flue gas conduit so, that the mixer plane extends to the whole diameter of said combustion chamber or the flue gas conduit and practically all flue gases flowing in said combustion chamber or flue gas conduit will penetrate said mixer plane.

16. An arrangement according to any of the preceding examples 1, 8, 9 or 11 wherein the ratio of fuel (PA) to be delivered to the combustion head (1) to the combustion air (I) to be delivered into the windbox (10) is adapted to be almost stoichiometric, i.e. within the lambda range of 0.998-1.002.

17. An arrangement according to Example 8, 9 or 11, wherein the residual oxygen-measuring lambda sensor (63) is located in the flue gas conduit (4) downstream of the first catalytic zone (40) of the catalytic three-way converter (401) in the flowing direction of flue gases.

18. An arrangement according to Example 1, 8, 9 or 11 wherein at least one catalytic three-way converter (401) with at least two catalytic zones (40) or at least two three-way converters (401) with at least one catalytic zone (40) is located in the flue gas conduit (4) which catalytic converter (401) is adapted for changing the redox potential of flue gases generated in thermal combustion carried out in the combustion chamber (10).

19. An arrangement according to Example 18, wherein the flue gas conduit (4), prior to the first catalytic zone (40) of at least one three-way converters (401) present in the flue gas conduit (4) upstream in the direction of flue gas (S), is supplied with supplementary combustion air (I) or fuel (PA) by way of an opening in a wall of the flue gas conduit.

20. An arrangement according to Example 1, 8, 9 or 11 wherein the three-way catalytic converter (401) is selected in view of being suitable for the reduction of NOx's present in flue gases generated in thermal combustion and for the oxidation of the hydrocarbon and carbon monoxide emissions of flue gases.

21. An arrangement according to Example 8, 9 or 11 wherein the measuring instruments (6) further include a sensor (61) which measures the amount of nitrogen oxides (NOx) from flue gases (S) and/or a sensor (62) which measures the amount of carbon monoxide from flue gases, and the adjustment for the secondary inlet flow ($Q_{PAB}$) of fuel traveling in the second section (215 of the transfer pipe system is further based on the amount of carbon monoxide and/or the amount of nitrogen oxides (NOx) measured from flue gases (S), such that, on the basis of nitrogen oxides (NOx) and carbon monoxide (CO) measured from flue gases, the burner automation (5, 6, 7) adjusts the amount of the secondary inlet flow of fuel by means of actuators 7, such as actuator-equipped control valves (7; 71), present in the second section (215) of the transfer pipe system or the adjustment by means of burner automation (5, 6, 7) for the secondary inlet flow ($Q_{IB}$) of combustion air traveling in the section (225) of a second transfer pipe system is also based on the amount of carbon monoxides and/or the amount of nitrogen oxides (NOx) measured from flue gases, such that, on the basis of nitrogen oxides (NOx) and carbon monoxide measured from flue gases, the burner automation adjusts, by means of actuators (7), such as actuator-equipped control valves (7; 71), present in the second transfer pipe system (225), the amount of the secondary inlet flow ($Q_{IB}$) of combustion air in the combustion air inlet flow ($Q_{Itot}$) to be delivered into the windbox (10).

22 An arrangement according to Example 21, characterized in that the CO sensor, that measures the amount of carbon monoxides, as well as the NOx sensor that measures the amount of nitrogen oxides (NOx), are located downstream of at least one catalytic three-way converter (401) with at least two catalytic zones (40) or at least two three-way converters (401) with at least one catalytic zone (40) in the flowing direction of flue gases (S).

23 An arrangement according to any of Examples 1, 8, 9 or 11 wherein the adjustment for the amount of combustion air (I) in the transfer pipe system (229) is carried on with one or more blowers (7; 72) present in the transfer pipe system, as well as with dampers (7; 73) adjustable in terms of their opening degree.

24. An arrangement according to Example 23 wherein the blower (7; 72) is provided with a frequency transformer by which the input power of a blower motor and thereby the rotational speed of a blower can be adjusted, depending on a desired rate of the combustion air flow ($Q_I$, $Q_{Itot}$).

25. An arrangement according to Example 8, 9 or 11 wherein the adjustment for the amount of the secondary inlet flow ($Q_{PAB}$) of fuel or the secondary inlet flow ($Q_{IB}$) of combustion air takes place by means of at least one actuator-equipped control valve (7; 71) or damper (7; 73).

26. An arrangement according to Example 8, 9 or 11 wherein the catalytic converter (401) comprises at least one three-way catalytic converters with at least two catalytic zones (40,40), which zones are successive in the progressing direction of flue gases and between which it is possible to supply supplementary combustion air by way of an additional supply conduit (222) of combustion air arriving in the flue gas conduit (4), and the ratio of fuel (PA) to be delivered into the mixing zone to combustion air (I) to be delivered into the windbox oscillates from slightly lower than stoichiometric to slightly higher than stoichiometric, such that the oxygen content of a flue gas arriving in the first catalytic zone is in the lambda range of 0.998-1.002.

27. Burner automation (5, 6, 7) capable of being used in an arrangement according to any of the preceding claim 1, 8, 9 or 11, comprising
a central processing unit (5), including a processor (52) and at least one memory element (51) which/both of which includes/include a software product/software products (510) for controlling the operation of a burner, particularly for adjusting the amount ($Q_I$, $Q_{Itot}$, $Q_{PA}$, $Q_{PAtot}$) of air and fuel,
measuring instruments (6), such as sensors (61, 62, 63), for collecting information about a combustion process to be adjusted,
data transfer elements for receiving measurement data from the measuring instruments (6) and communicating the same to the processor (52) and software products (510) of the central processing unit (5), comprising especially the reception of measurement data related to the amount of residual oxygen from a flue gas oxidation/reduction potential-measuring sensor (63), such as a lambda sensor, present in flue gases, and the communication of measurement data to the processor (5; 52) and burner control software (510) of the central processing unit, as well as for transmitting control instructions, generated by the central processing unit, to actuators (7) adjusting the amount of air and fuel (PA) to be delivered, wherein the central processing unit (52) is adapted to generate, by way of the burner control software (510),
control instructions ($710^5$, $710^6$, $710^7$) related to the amount of the secondary inlet flow ($Q_{PAB}$) of fuel, whereby the secondary inlet flow ($Q_{PAB}$) of fuel is adjustable in such a way that the amount ($Q_{PAB}$) of the secondary inlet flow in the inlet flow ($Q_{PAtot}$) of fuel is such that the amount of residual oxygen oxygen is within the range of 0.01-0.50% preferably within the range of 0.01-0.25% in flue gases prior to the first catalytic zone (40) of the at least one three-way catalytic converter
control instructions ($710^8$) related to the amount of the primary inlet flow ($Q_{PAA}$) of fuel, which are based on a predetermined amount of residual oxygen in flue gases (S), preferably on the amount of 1-2.5% residual oxygen in flue gases (40),
control instructions ($710^1$, $710^4$) for the inlet flow of combustion air (I), which are used for adjusting the amount of the inlet flow ($Q_I$) of combustion air arriving in the windbox (10) by way of the combustion air supply conduit (220), based on a predetermined amount of residual combustion air oxygen in flue gases, preferably on the amount of 1-2.5% residual oxygen in flue gases, and
after being generated by the central processing unit (5), the data transfer elements are adapted to communicate control instructions ($710^5$, $710^6$, $710^7$) for the secondary inlet flow ($Q_{PAB}$) of fuel (PA) to an actuator (7) adjusting the amount of the secondary inlet flow, preferably to an actuator-equipped control valve (7; 71), such as a servo motor-operated control valve, adjusting said amount of the secondary inlet flow ($Q_{PAB}$) in the pipe system (215) for the secondary inlet flow,
control instructions ($710^8$) for the primary inlet flow ($Q_{PAA}$) of fuel (PA) to an actuator (7) adjusting the amount of the primary inlet flow, preferably to an actuator-equipped control valve (7; 71), such as a servo motor-operated control valve, adjusting said amount of the primary inlet flow in the pipe system for the primary inlet flow, and
control instructions ($710^1$, $710^4$) for the inlet flow of combustion air (I) to an actuator (7) adjusting the amount of combustion air, preferably to the inverter of a blower (7; 72) adjusting said amount of combustion air in the combustion air transfer pipe system, and/or to electric motors, such as servo motor-operated valves, adjusting the setting of dampers and valves.

28. Burner automation defined in Example 28 wherein burner automation uses Smith predictor for adjusting the amount of the secondary inlet flow.

29. The arrangement defined in Example 1 or 10 wherein said industrial burner has output of at least 3 MWh and the diameter of said mixer is 300 mm or more.

30. The arrangement defined in Example 1 or 10 wherein fuel is delivered into mixing zone via one fuel supply conduit (210).

What is claimed is:
1. A burner configured to burn a fuel and having reduced nitrogen oxide(s) (NOx) and carbon monoxide (CO) from flue gases, the burner comprising:
supply conduits for providing corresponding inlet flows of a combustion air and of the fuel to the burner and further into a mixing zone of the burner for mixing the fuel with the combustion air using a burner automation system;

a combustion chamber for generating the flue gases in the combustion chamber by combusting the combustion air and the fuel delivered into the mixing zone;

a flue gas conduit comprising a multi-zone three-way catalytic converter comprising two or more successive catalytic zones;

measurement instruments comprising one or more oxygen ($O_2$) sensors, a plurality of carbon monoxide (CO) sensors and one or more nitrogen oxide(s) ($NO_x$) sensors;

a burner automation system comprising a central processing unit responsive to input signals from the measurement instruments and providing control signals to corresponding devices/actuators controlling delivery of the fuel, the combustion air and a supplementary air; and wherein the burner automation system is configured to provide the control signals for:

providing concentration in the flue gases after the multi-zone three-way catalytic converter for the $NO_x$ and the CO to be within corresponding predefined ranges by measuring of concentration of the $NO_x$ and the CO being performed using corresponding sensors of the plurality of CO sensors and of the one or more of $NO_x$ sensors, said providing is implemented using adjustment of an inlet flow of a combustion air and an inlet flow of the fuel arriving into the mixing zone, so that:

a mean amount of residual oxygen in moles compared to a mean amount of carbon monoxide in moles, is stochiometric about 0.5/1 (mole/mole) in flue gases prior to a first catalytic zone or at the first catalytic zone of the multi-zone three-way catalytic converter, and an amount of the residual oxygen is within a predetermined percentage range in the flue gases prior to the first catalytic zone or at the first catalytic zone of the multi-zone three-way catalytic converter, where measuring amounts of the residual oxygen and CO being performed using corresponding sensors of the plurality of CO sensors and the one or more $O_2$ sensors; and adjusting the inlet flows of the combustion air and the fuel arriving into the mixing zone, the adjusting is provided in two stages comprising:

a primary adjustment providing a first predetermined percentage range of oxygen in flue gases prior to the first catalytic zone or at the first catalytic zone of the multi-zone three-way catalytic converter, based on estimating/calculating and a corresponding control signal at least to one of actuating valves, provided by the central processing unit, to facilitate adjusting a primary inlet flow of at least one of the fuel and the combustion air through a corresponding fuel or combustion air first transfer pipe line, and a secondary adjustment providing a second predetermined percentage range of oxygen, the second predetermined percentage range is below the first predetermined percentage range, in the flue gases prior to the first catalytic zone or at the first catalytic zone of the multi-zone three-way catalytic converter based on a further corresponding control signal, provided by the central processing unit using the measured amount of the residual oxygen, at least to one of further actuating valves to provide adjusting of a secondary inlet flow of the at least one of the fuel and of the combustion air through a corresponding fuel or combustion air second transfer pipe line.

2. The burner of claim 1, wherein the central processing unit of the burner automation system comprises a processor, at least one memory element for storing a software product/software comprising computer program instructions capable of being executed by the processor for controlling operation of the burner, and a data transfer element for receiving the input signals from the measurement instruments and for transmitting the control signals to the corresponding devices/actuators controlling delivery of the fuel, the combustion air and a supplementary air.

3. The burner of claim 1, wherein the multi-zone three-way catalytic converter is configured to reduce the oxides of nitrogen ($NO_x$) to nitrogen ($N_2$) and oxygen ($O_2$) and oxidizes hydrocarbons (HC) and the carbon monoxide (CO) to carbon dioxide ($CO_2$) and water ($H_2O$).

4. The burner of claim 1, wherein the flue gases prior to the first catalytic zone or at the first catalytic zone of the multi-zone three-way catalytic converter comprise the amount of the measured residual oxygen of 0.01-0.5% or 0.01-0.25%, and further comprise the CO under 6000 ppm and $NO_x$ under 100 ppm.

5. The burner of claim 1, wherein the first predetermined percentage range in flue gases prior to the first catalytic zone or at the first catalytic zone of the multi-zone three-way catalytic converter for the amount of the measured residual oxygen is 1.0-2.5%.

6. The burner of claim 1, wherein the second predetermined percentage range in flue gases prior to the first catalytic zone or at the first catalytic zone of the multi-zone three-way catalytic converter for the amount of the measured residual oxygen is 0.01-0.5% or 0.01-0.25%.

7. The burner of claim 1, further comprising:

an extra supply conduit between catalytic zones of the multi-zone three-way catalytic converter for delivering the supplementary air to provide a desirable amount of the $NO_x$ and the CO in the flue gases after the multi-zone three-way catalytic converter, and wherein the burner automation system is configured to provide the control signals for:

delivering and adjusting the supplementary air through the extra supply conduit between catalytic zones of the multi-zone three-way catalytic converter, so that concentrations of the $NO_x$ and the CO in the flue gases after the multi-zone three-way catalytic converter for the $NO_x$ and the CO are within predefined ranges, measuring of concentration of the $NO_x$ and the CO being performed using corresponding sensors of the plurality of CO sensors and the one or more $NO_x$ sensors.

8. The burner of claim 7, wherein said predefined ranges after the multi-zone three-way catalytic converter for the $NO_x$ and the CO are:

0-9 ppm for the $NO_x$, and 0-100 ppm or 1-40 ppm for the CO.

9. The burner of claim 7, wherein the delivery of supplementary air is further based on measuring an amount of residual oxygen after the first catalytic zone of the multi-zone three-way catalytic converter.

10. The burner of claim 1, wherein the one or more oxygen ($O_2$) sensors are lambda oxygen sensors.

11. The burner of claim 1, wherein said burner is an industrial burner having an output of at least 3 MW.

12. The burner of claim 1, wherein the fuel is a liquid, a gas or a combination of liquid and gas.

13. The burner of claim 1, wherein the adjusting the primary inlet flow of at least one of the fuel and the combustion air through the corresponding fuel or combustion air first transfer pipe line engages about 70-100% of a total amount of fuel or a total amount of combustion air used for said two-stage adjustment, and the adjusting the secondary inlet flow of the at least one of the fuel and the combustion air through the corresponding fuel or combustion air second transfer pipe line engages about 0-30% of the total amount of fuel or the total amount of combustion air used for said two-stage adjustment.

14. The burner of claim 1, wherein the adjusting the primary inlet flow of at least one of the fuel and the combustion air through the corresponding fuel or combustion air first transfer pipe line engages about 80-100% of a total amount of fuel or a total amount of combustion air used for said two-stage adjustment, and the adjusting the secondary inlet flow of the at least one of the fuel and the combustion air through the corresponding fuel or combustion air second transfer pipe line c engages about 0-20% of the total amount of fuel or the total amount of combustion air used for said two-stage adjustment.

15. The burner of claim 1, wherein the at least one of the fuel and the combustion air used for the primary and secondary adjustments is the fuel.

16. The burner of claim 1, wherein the at least one of the fuel and the combustion air used for the primary and secondary adjustments is the combustion air.

17. The burner of claim 1, wherein said burner automation system uses a Smith predictor for the adjusting the secondary inlet flow.

18. The burner of claim 1, wherein a ratio of the fuel delivered to the combustion head of the burner compared to the combustion air delivered into a windbox of the burner, both being delivered through the supply conduits for providing the corresponding inlet flows, is adapted to be substantially stoichiometric within a lambda range of 0.998-1.002.

19. The burner of claim 1, wherein the flue gases comprising $O_2$, CO and $NO_x$ gases which arrive to the first catalytic zone of said multi-zone three-way catalytic converter have been homogenized by a mixer located prior to said first catalytic zone in the flue gas conduit or in a heat exchange area of the burner.

20. The burner of claim 19, wherein, in said homogenized flue gases, a difference between a maximal $CO/O_2$-ratio (both in moles/m$^3$) and a minimal $CO/O_2$ ratio (both in moles/m$^3$), penetrating a cross section of the flue gas conduit or the heat exchange area, is less than 5% after said mixer.

21. The burner of claim 19, wherein the mixer is installed at the combustion chamber or at the flue gas conduit such that a mixer cross-sectional plane extends to a full diameter of the heat exchange area after the combustion chamber or in the flue gas conduit, and substantially all flue gases flowing in said combustion chamber or the flue gas conduit penetrate said mixer cross-sectional plane, wherein a diameter of the mixer is 300 mm or more.

22. The burner of claim 19, wherein the mixer is a static mixer, a plate mixer, a throttling mixer or a counter swirl mixer.

23. The burner of claim 1, wherein said multi-zone three-way catalytic converter comprises at least one three-way catalytic converter with two catalytic zones or at least two three-way catalytic converters each having one catalytic zone, so that an additional supply conduit is provided between two successive catalytic zones to enable delivering a supplementary air between said catalytic zones.

24. A method for reducing nitrogen oxide(s) and carbon monoxide from flue gases of an industrial burner said method comprising:

providing a burner configured to burn a fuel, the burner comprises: a mixing zone for mixing the fuel with a combustion air, followed by a combustion chamber, followed by a flue gas conduit comprising a multi-zone three-way catalytic converter comprising two or more successive catalytic zones, measurement instruments comprising one or more oxygen ($O_2$) sensors, a plurality of carbon monoxide (CO) sensors and one or more nitrogen oxides ($NO_x$) sensors, and a burner automation system comprising a central processing unit responsive to input signals from the measurement instruments and providing control signals to devices/actuators controlling delivery of the fuel and of the combustion air;

delivering through corresponding supply conduits inlet flows of the combustion air and of the fuel to the burner and further into the mixing zone using the burner automation system;

generating flue gases in the combustion chamber by combusting the combustion air and the fuel delivered into the mixing zone;

directing the flue gases to said multi-zone three-way catalytic converter;

providing concentration in the flue gases after the multi-zone three-way catalytic converter for the $NO_x$ and the CO to be within corresponding predefined ranges by measuring of concentration of the $NO_x$ and the CO being performed using corresponding sensors of the plurality of CO sensors and of the one or more of $NO_x$ sensors, said providing is implemented using adjustment of an inlet flow of a combustion air and an inlet flow of the fuel arriving into the mixing zone using said burner automation system, so that:

a mean amount of residual oxygen in moles compared to a mean amount of carbon monoxide in moles, is stochiometric about 0.5/1 (mole/mole) in flue gases prior to a first catalytic zone or at the first catalytic zone of the multi-zone three-way catalytic converter, and an amount of the residual oxygen is within a predetermined percentage range in the flue gases prior to the first catalytic zone or at the first catalytic zone of the multi-zone three-way catalytic converter, where measuring amounts of the residual oxygen and CO being performed using corresponding sensors of the plurality of CO sensors and the one or more 02 sensors; and adjusting the inlet flows of the combustion air and the fuel arriving into the mixing zone using said burner automation system, the adjusting is provided in two stages comprising:

a primary adjustment providing a first predetermined percentage range of oxygen in flue gases prior to the first catalytic zone or at the first catalytic zone of the multi-zone three-way catalytic converter, based on estimating/calculating and a corresponding control signal at least to one of actuating valves, provided by the central processing unit, to facilitate adjusting a primary inlet flow of at least one of the fuel and the combustion air through a corresponding fuel or combustion air first transfer pipe line, and a secondary adjustment providing a second predetermined percentage range of oxygen, the second predetermined percentage range is below the first predetermined percentage range, in the flue gases prior to the first catalytic zone or at the first catalytic zone of the multi-zone three-way catalytic converter based on a further corresponding control signal, provided by the central processing unit using the measured amount of the residual oxygen, at least to one of further actuating valves to provide adjusting of a secondary inlet flow of the at least one of the fuel and of the combustion air through a corresponding fuel or combustion air second transfer pipe line.

25. The method of claim 24, wherein the flue gases prior to the first catalytic zone or at the first catalytic zone of the multi-zone three-way catalytic converter comprise the amount of the measured residual oxygen of 0.01-0.5% or 0.01-0.25%, and further comprise the CO under 6000 ppm and $NO_x$ under 100 ppm.

26. The method of claim 24, wherein the first predetermined percentage range in flue gases prior to the first catalytic zone or at the first catalytic zone of the multi-zone three-way catalytic converter for the amount of the measured residual oxygen is 1.0-2.5%.

27. The method of claim 24, wherein the second predetermined percentage range in flue gases prior to the first catalytic zone or at the first catalytic zone of the multi-zone three-way catalytic converter for the amount of the measured residual oxygen is 0.01-0.5% or 0.01-0.25%.

28. The method of claim 24, further comprising:
delivering and adjusting the supplementary air through an extra supply conduit between catalytic zones of the multi-zone three-way catalytic converter, so that concentrations of the $NO_x$ and the CO in the flue gases after the multi-zone three-way catalytic converter for the $NO_x$ and the CO are within predefined ranges, measuring of concentration of the $NO_x$ and the CO being performed using corresponding sensors of the plurality of CO sensors and the one or more $NO_x$ sensors.

29. The method of claim 24, wherein the burner is an industrial burner.

30. The method of claim 24, wherein the flue gases comprising $O_2$, CO and $NO_x$ gases which arrive to the first catalytic zone of said multi-zone three-way catalytic converter have been homogenized by a mixer located prior to said first catalytic zone in the flue gas conduit or in a heat exchange area of the burner.

* * * * *